US009653714B2

(12) United States Patent
Mori et al.

(10) Patent No.: US 9,653,714 B2
(45) Date of Patent: May 16, 2017

(54) ELECTRIC STORAGE DEVICE AND ELECTRIC STORAGE APPARATUS

(71) Applicant: GS Yuasa International Ltd., Kyoto-shi (JP)

(72) Inventors: Sumio Mori, Kyoto (JP); Tomonori Kako, Kyoto (JP); Akihiko Miyazaki, Kyoto (JP); Kenta Nakai, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 280 days.

(21) Appl. No.: 14/227,394

(22) Filed: Mar. 27, 2014

(65) Prior Publication Data
US 2014/0295220 A1    Oct. 2, 2014

(30) Foreign Application Priority Data

Mar. 27, 2013 (JP) .................. 2013-067567
Mar. 27, 2013 (JP) .................. 2013-067568
Mar. 27, 2013 (JP) .................. 2013-067569
Mar. 27, 2013 (JP) .................. 2013-067570

(51) Int. Cl.
*H01M 2/12*     (2006.01)
*H01M 2/02*     (2006.01)
(Continued)

(52) U.S. Cl.
CPC ............... *H01M 2/12* (2013.01); *H01G 9/12* (2013.01); *H01G 11/18* (2013.01); *H01M 2/024* (2013.01); *H01M 2/0478* (2013.01); *H01M 2/1077* (2013.01); *H01M 2/263* (2013.01); *H01M 2/305* (2013.01); *H01M 10/613* (2015.04);
(Continued)

(58) Field of Classification Search
CPC .... H01M 2/12; H01M 2/1235; H01M 2/1241; H01M 2/0408; H01M 2/043; H01M 2/0469; H01M 2/0473; H01M 10/647
See application file for complete search history.

(56) References Cited

U.S. PATENT DOCUMENTS 4,119,772 A * 10/1978 Peters .................... H01M 2/02
                                                        429/204
6,265,096 B1 * 7/2001 Tucholski ............. H01M 2/023
                                                        429/171
(Continued)

FOREIGN PATENT DOCUMENTS

JP    H 06-203813 A    7/1994
JP    H 09-073885 A    3/1997
(Continued)

Primary Examiner — Scott J Chmielecki
(74) Attorney, Agent, or Firm — McGinn IP Law Group, PLLC

(57) ABSTRACT

An electric storage device is provided with an electrode assembly including a positive electrode plate and a negative electrode plate; a case for housing the electrode assembly; a positive-electrode external terminal arranged on an outer surface of the case and electrically connected to the positive electrode plate; a negative-electrode external terminal arranged on an outer surface of the case and electrically connected to the negative electrode plate; and a gas exhaust valve formed in a region of the case on the opposite side of a region where the positive-electrode external terminal and the negative-electrode external terminal are arranged.

19 Claims, 25 Drawing Sheets

(51) Int. Cl.

| | | |
|---|---|---|
| *H01M 2/04* | (2006.01) | |
| *H01M 2/10* | (2006.01) | |
| *H01M 2/26* | (2006.01) | |
| *H01M 2/30* | (2006.01) | |
| *H01G 9/12* | (2006.01) | |
| *H01G 11/18* | (2013.01) | |
| *H01M 10/625* | (2014.01) | |
| *H01M 10/647* | (2014.01) | |
| *H01M 10/6557* | (2014.01) | |
| *H01M 10/613* | (2014.01) | |

(52) U.S. Cl.
CPC ....... *H01M 10/625* (2015.04); *H01M 10/647* (2015.04); *H01M 10/6557* (2015.04); *Y02E 60/13* (2013.01)

(56) References Cited

U.S. PATENT DOCUMENTS

| | | | |
|---|---|---|---|
| 6,627,348 B1 | 9/2003 | Haraguchi et al. | |
| 2006/0024568 A1 | 2/2006 | Lee | |
| 2006/0063067 A1* | 3/2006 | Kim | H01M 2/021 429/148 |
| 2007/0190402 A1* | 8/2007 | Kumeuchi | H01M 2/0257 429/53 |
| 2009/0142650 A1* | 6/2009 | Okada | H01M 2/1077 429/71 |
| 2009/0206096 A1 | 8/2009 | Hirotsu et al. | |
| 2011/0039152 A1 | 2/2011 | Kim et al. | |
| 2011/0104528 A1* | 5/2011 | Byun | H01M 2/1241 429/61 |
| 2012/0052359 A1 | 3/2012 | Yoshitake et al. | |
| 2012/0196160 A1 | 8/2012 | Guen | |
| 2012/0308855 A1 | 12/2012 | Shimizu et al. | |
| 2012/0321922 A1 | 12/2012 | Kim et al. | |
| 2013/0059175 A1* | 3/2013 | Engel | H01M 2/12 429/50 |
| 2013/0084471 A1* | 4/2013 | Han | H01M 2/043 429/7 |

FOREIGN PATENT DOCUMENTS

| | | |
|---|---|---|
| JP | H 10-156443 A | 6/1998 |
| JP | H10-284036 A | 10/1998 |
| JP | 2000-133211 A | 5/2000 |
| JP | 2002-042753 A | 2/2002 |
| JP | 2002-343310 A | 11/2002 |
| JP | 2003-151507 A | 5/2003 |
| JP | 3427216 B2 | 7/2003 |
| JP | 2005-332700 A | 12/2005 |
| JP | 2006-040899 A | 2/2006 |
| JP | 2006-320918 A | 11/2006 |
| JP | 2007-250423 A | 9/2007 |
| JP | 2008-226519 A | 9/2008 |
| JP | 2010-244898 A | 10/2010 |
| JP | 2011-040381 A | 2/2011 |
| JP | 2011-192547 A | 9/2011 |
| JP | 2012-015121 A | 1/2012 |
| JP | 2012-038603 A | 2/2012 |
| JP | 2012-043655 A | 3/2012 |
| JP | 2012-074287 A | 4/2012 |
| JP | 2012-079501 A | 4/2012 |
| JP | 2012-094358 A | 5/2012 |
| JP | 2012-094507 A | 5/2012 |
| JP | 2012-109126 A | 6/2012 |
| JP | 4973910 B2 | 7/2012 |
| JP | 2012-160425 A | 8/2012 |
| JP | 2012-169227 A | 9/2012 |
| JP | 2012-174532 A | 9/2012 |
| JP | 2013-004177 A | 1/2013 |
| JP | 2013-509688 A | 3/2013 |
| WO | WO 2010-131700 A1 | 11/2010 |

\* cited by examiner

F I G . 10
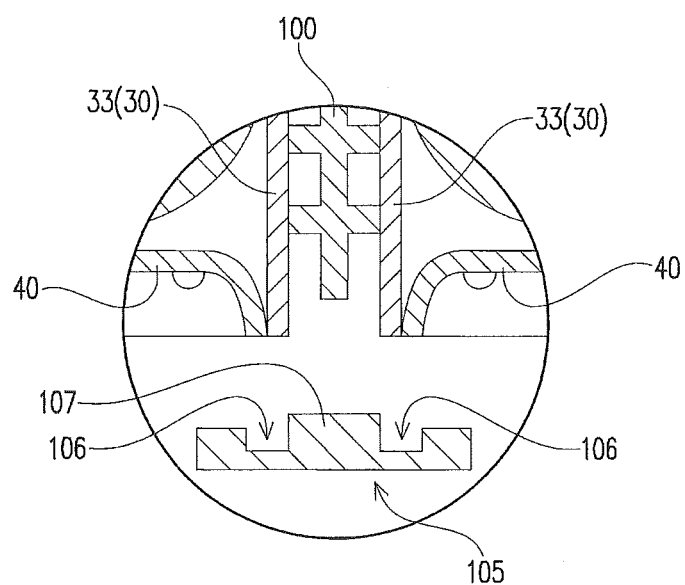

F I G . 14
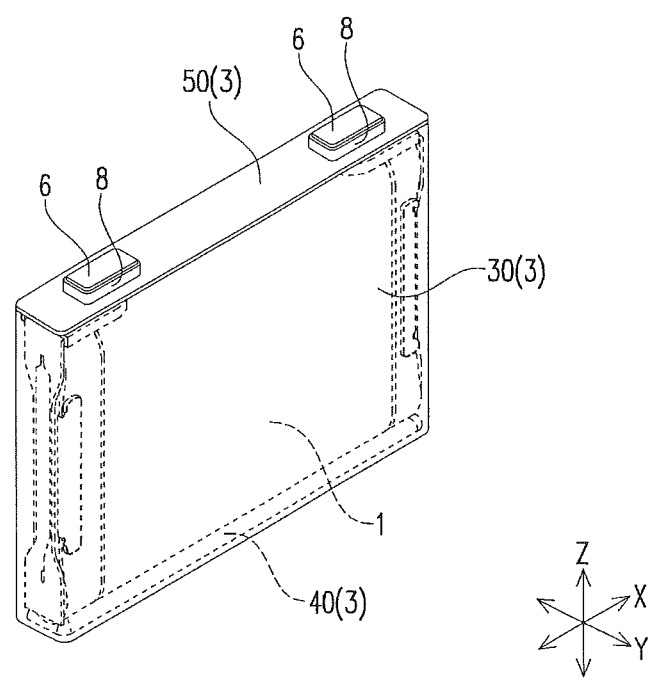

F I G . 15
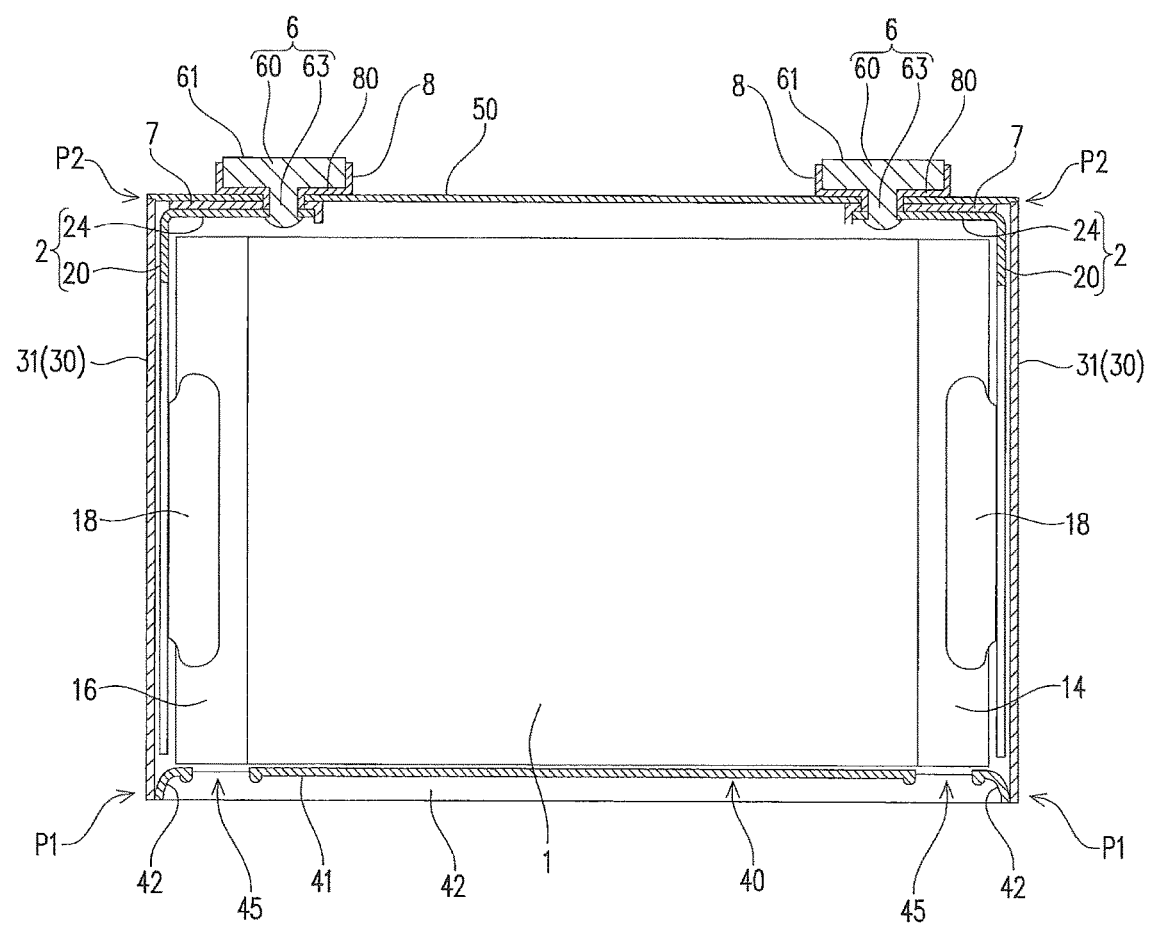

F I G . 19
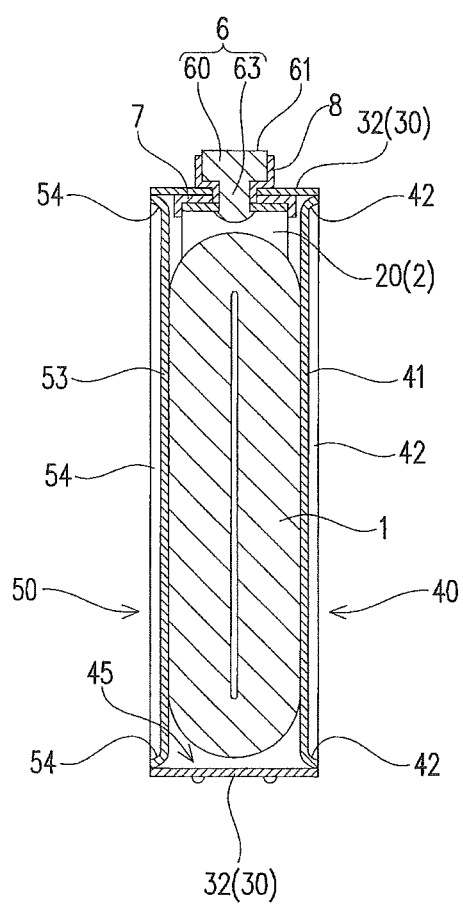

ELECTRIC STORAGE DEVICE AND ELECTRIC STORAGE APPARATUS

CROSS-REFERENCE TO RELATED APPLICATIONS

This application claims the benefit of Japanese Patent Application Nos. 2013-067567, 2013-067568, 2013-067569 and 2013-067570, which are incorporated herein by reference.

FIELD

The present invention relates to an electric storage device and an electric storage apparatus, which are provided with gas exhaust valves.

BACKGROUND

In recent years, rechargeable electric storage devices, such as battery cells (lithium-ion battery cells, nickel-metal-hydride battery cells and the like) and capacitors (electric double layer capacitors and the like) have been adopted as power sources of vehicles (e.g., automobiles, two-wheeled motor vehicles and the like) and various equipment (mobile terminals, notebook-size personal computers and the like). This type of electric storage device is provided with an electrode assembly including a positive electrode plate and a negative electrode plate insulated from each other, a case for housing the electrode assembly, and external terminals arranged on an outer surface of the case and electrically connected to the electrode assembly.

This type of electric storage device is provided with a gas exhaust valve for releasing the internal pressure of the device by means of rupture or cleavage if the internal pressure exceeds a certain value. The gas exhaust valve is arranged on a cover plate along with the external terminals (Japanese Patent Laid-Open Nos. 2010-244898 and 2011-192547). Accordingly, constituents of a gas discharged from the gas exhaust valve or an electrolytic solution discharged therefrom as the gas is discharged may adhere to the external terminals or the vicinity thereof when the gas exhaust valve operates. If the constituents of the gas or the electrolytic solution adhere to the external terminals or the vicinity thereof, an unfavorable situation, such as corrosion, occurs due to a potential difference.

SUMMARY

The following presents a simplified summary of the invention disclosed herein in order to provide a basic understanding of some aspects of the invention. The summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage device and an electric storage apparatus capable of suitably preventing constituents of a gas or an electrolytic solution discharged from a gas exhaust valve from adhering to external terminals or the vicinity thereof when the gas exhaust valve operates.

An electric storage device according to an aspect of the present invention is provided with: an electrode assembly including a positive electrode plate and a negative electrode plate insulated from each other; a case for housing the electrode assembly, the case being insulated from the electrode assembly; a positive-electrode external terminal arranged on an outer surface of the case and electrically connected to the positive electrode plate, and a negative-electrode external terminal arranged on an outer surface of the case and electrically connected to the negative electrode plate; and a gas exhaust valve formed in a region of the case on the opposite side of a region where the positive-electrode external terminal and the negative-electrode external terminal are arranged.

BRIEF DESCRIPTION OF DRAWINGS

The foregoing and other features of the present invention will become apparent from the following description and drawings of an illustrative embodiment of the invention in which:

FIG. 10 is an enlarged view in which components encircled by a dashed line in FIG. 9 is exploded;

FIG. 14 is a perspective view of the battery cell;

FIG. 15 is a cross-sectional view of the battery cell cut along the lengthwise direction thereof;

FIG. 19 is a cross-sectional view of the battery cell cut along the widthwise direction thereof;

DETAILED DESCRIPTION OF THE PREFERRED EMBODIMENT

Figure 1:
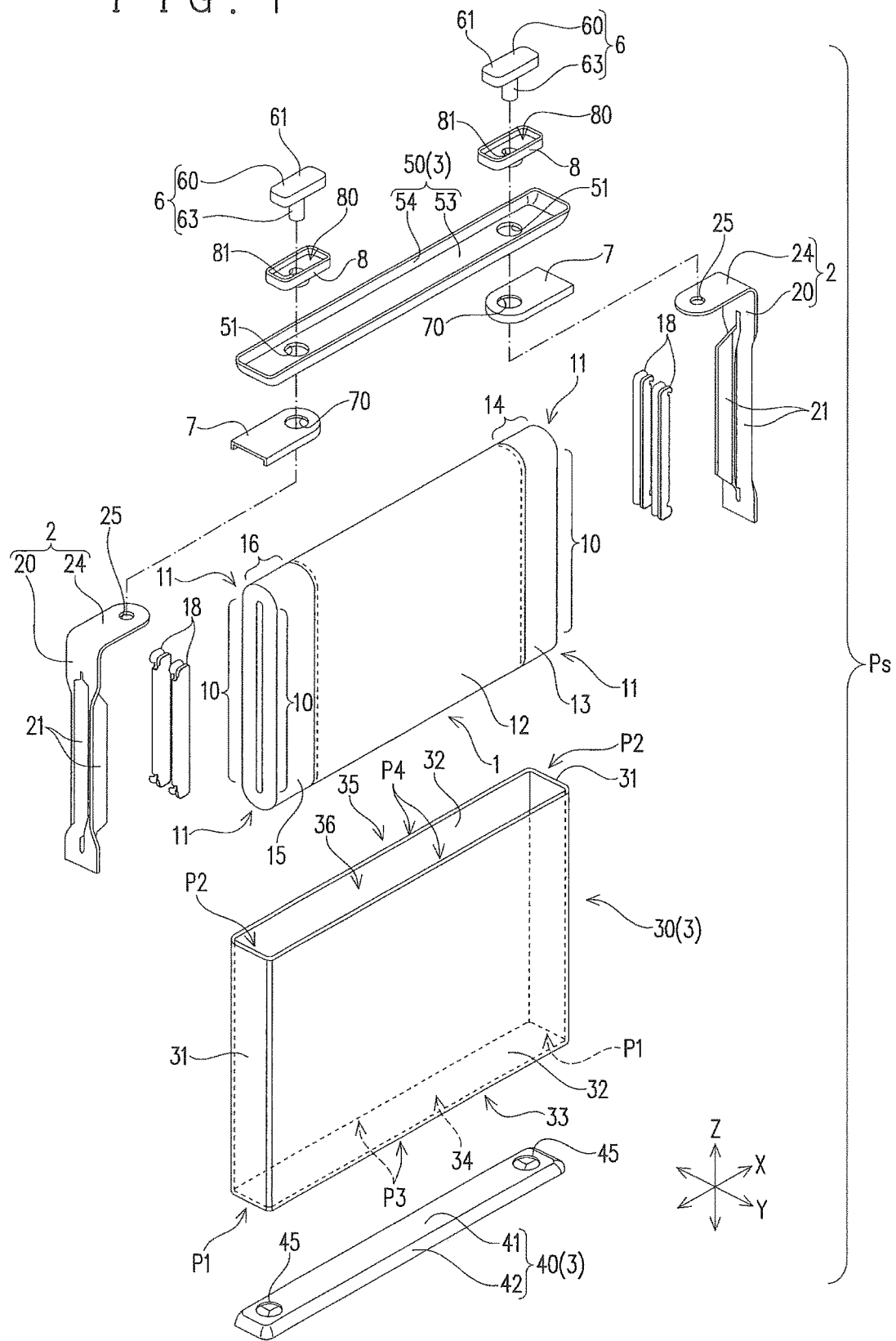
FIG. 1 is an exploded perspective view of a battery cell according to an embodiment of the present invention.

An electric storage device according to an aspect of the present invention is provided with: an electrode assembly including a positive electrode plate and a negative electrode plate insulated from each other; a case for housing the electrode assembly, the case being insulated from the electrode assembly; a positive-electrode external terminal arranged on an outer surface of the case and electrically connected to the positive electrode plate and a negative-electrode external terminal arranged on the outer surface of the case and electrically connected to the negative electrode plate; and a gas exhaust valve formed in a region of the case on the opposite side of a region where the positive-electrode external terminal and the negative-electrode external terminal are arranged.

According to such a configuration as described above, the gas exhaust valve is formed in a region of the case farthest from both of the positive-electrode external terminal and the negative-electrode external terminal. Accordingly, it is possible to prevent constituents of a gas and an electrolytic solution discharged from the gas exhaust valves from adhering to external terminals (the positive-electrode external terminal and the negative-electrode external terminal) or the vicinity thereof when the gas exhaust valve operates.

In another aspect of the electric storage device according to the present invention, it may be configured that the case includes a pair of opposed outer surfaces, the positive-electrode external terminal and the negative-electrode external terminal are located on one of the pair of outer surfaces, and the gas exhaust valve is formed on the other of the pair of opposed outer surfaces.

According to such a configuration as described above, the positive-electrode external terminal and the negative-electrode external terminal are located on one of the pair of opposed outer surfaces, and the gas exhaust valve is formed on the other of the pair of opposed outer surfaces. Accordingly, the gas exhaust valve is formed on the outer surface located farthest from the outer surface of the case on which the positive-electrode external terminal and the negative-electrode external terminal are located. It is therefore possible to prevent constituents of a gas and an electrolytic solution discharged from the gas exhaust valves from adhering to the external terminals or the vicinity thereof when the gas exhaust valve operates.

In another aspect of the electric storage device according to the present invention, it may be configured that the case is provided with a case body including a first opening edge portion in one end thereof; and a first cover plate for closing a first opening formed by the first opening edge portion, wherein the gas exhaust valve is formed in the first cover plate.

According to such a configuration as described above, it is easy to form the gas exhaust valve in the first cover plate when manufacturing the electric storage device, thereby increasing the degree of freedom in the shape of the gas exhaust valve.

In yet another aspect of the electric storage device according to the present invention, it may be configured that the case body includes a second opening edge portion which is an opening edge portion located on the opposite side of the first opening edge portion, and the case is provided with a second cover plate for closing a second opening formed by the second opening edge portion.

In still another aspect of the electric storage device according to the present invention, it may be configured that the first cover plate is a plate member in which the outer peripheral portion of the first cover plate is mated with the inner circumferential surface of the first opening edge portion and which is convexed inwardly, and the gas exhaust valve is formed in a portion of the first cover plate convexed inwardly.

According to such a configuration as described above, the gas exhaust valve is located in a position of the first cover plate displaced inward into the case body from the edges of the first opening edge portion of the case body. That is, the gas exhaust valve is surrounded by the outer peripheral portion of the first cover plate and the first opening edge portion of the case body. Accordingly, it is possible to restrict the diffusion of a gas and an electrolytic solution by the outer peripheral portion of the first cover plate and the first opening edge portion of the case body when the gas exhaust valve operates.

In still another aspect of the electric storage device according to the present invention, it may be configured that the electrode assembly has a multilayer structure in which the positive electrode plate and the negative electrode plate are multilayered, at least one of the positive electrode plate and the negative electrode plate includes a lead portion which protrudes in a state of being layered, and the gas exhaust valve is formed in a place of the case opposed to the lead portion.

In this case, it may be configured that the multilayer structure is formed such that the positive electrode plate and the negative electrode plate are wound so as to have a flattened shape including a pair of opposed flat portions and a pair of curved portions connecting the end portions of the pair of flat portions to each other, the lead portion protrudes in a direction in which at least one of the positive electrode plate and the negative electrode plate extends along the winding center of the electrode assembly from a side edge of the other electrode plate, and the gas exhaust valve is formed in a place of the case opposed to the curved portion of the lead portion.

According to such a configuration as described above, the gas exhaust valve is arranged in a place of the case close to the lead portion. A gas is generated inside the electrode assembly and escapes from the lead portions which is an open end to the outside of the electrode assembly. Accordingly, when the gas exhaust valve is arranged in the vicinity of the lead portion, the exhaust passage of the gas inside the case is shortened, thereby smoothing the discharge of the gas.

Furthermore, it may be configured that the lead portion is provided with a positive-electrode lead portion in one end of the electrode assembly and a negative-electrode lead portion in the other end of the electrode assembly, and the gas exhaust valve includes a first gas exhaust valve formed in a place of the case opposed to the positive-electrode lead portion and a second gas exhaust valve formed in a place of the case opposed to the negative-electrode lead portion.

According to such a configuration as described above, it is possible to quickly discharge a gas generated inside the electrode assembly from the gas exhaust valves (the first gas exhaust valve and the second gas exhaust valve) in two places through the lead portions (the positive-electrode lead portion and the negative-electrode lead portion) in two places.

In still another aspect of the electric storage device according to the present invention, it may be configured that the electric storage device is provided with a first current collector for connecting the positive electrode plate and the positive-electrode external terminal and a second current collector for connecting the negative electrode plate and the negative-electrode external terminal, and the connecting portion between the electrode assembly and at least one of the first current collector and the second current collector is formed in a position of the electrode assembly displaced toward regions where the positive-electrode external terminal and the negative-electrode external terminal are arranged.

According to such a configuration as described above, the degree of openness can be increased in a region of the positive-electrode lead portion and the negative-electrode lead portion on the opposite side of the region where the positive-electrode external terminal and the negative-electrode external terminal are arranged (i.e., a location on the side of the region where the gas exhaust valves are arranged). Accordingly, it is possible to enhance the efficiency of discharging a gas generated inside the electrode assembly from the positive-electrode lead portion and the negative-electrode lead portion.

An electric storage apparatus according to the present invention is provided with two or more electric storage devices including at least one of the above-described electric storage devices.

According to such a configuration as described above, it is possible to prevent constituents of a gas and an electrolytic solution discharged from the gas exhaust valves from adhering to an external terminal (at least one of the positive-electrode external terminal and the negative-electrode external terminal) of an electric storage device or the vicinity thereof when the gas exhaust valve operates in the electric storage device in which the gas exhaust valve is located in positions distant from the positions of the case where the positive-electrode external terminal and the negative-electrode external terminal are located.

Here, in one aspect of the electric storage apparatus according to the present invention, it may be configured that the electric storage apparatus is provided with a shielding member arranged between adjacent electric storage devices of the two or more electric storage devices, and the shielding member partitions a space in which at least one of the positive-electrode external terminal and the negative-electrode external terminal is arranged and a space in which the gas exhaust valve is arranged.

As the result of the shielding member for partitioning the space in which at least one of the positive-electrode external terminal and the negative-electrode external terminal is arranged and the space in which the gas exhaust valve is arranged being provided as described above, it is possible to further enhance the effect of preventing constituents of a gas and an electrolytic solution discharged from the gas exhaust valves from adhering to an external terminal (at least one of the positive-electrode external terminal and the negative-electrode external terminal) of the electric storage device or the vicinity of the external terminal when the gas exhaust valve operates.

In another aspect of the electric storage apparatus according to the present invention, it may be configured that a gap is formed between adjacent electric storage devices, and the shielding member includes a first shielding member for partitioning the gap and the space in which the gas exhaust valve is arranged.

According to such a configuration as described above, it is possible to effectively prevent a gas discharged from the gas exhaust valves when the gas exhaust valve operates from mixing with a cooling medium and being diffused by the cooling medium, in a case where, for example, a so-called air-cooled cooling system in which the electric storage devices are cooled as the result of the cooling medium, such as air, flowing through the gap between the electric storage devices is adopted in the electric storage apparatus.

In yet another aspect of the electric storage apparatus according to the present invention, it may be configured that the shielding member includes a second shielding member for partitioning the gap and the space in which at least one of the positive-electrode external terminal and the negative-electrode external terminal is arranged.

According to such a configuration as described above, it is possible to more effectively prevent constituents of a gas and an electrolytic solution discharged from the gas exhaust valve from adhering to an external terminal (at least one of the positive-electrode external terminal and the negative-electrode external terminal) or the vicinity of the external terminal when the gas exhaust valve operates.

In still another aspect of the electric storage apparatus according to the present invention, the gap formed between adjacent electric storage devices may be a cooling flow passage through which a cooling fluid can flow.

In still another aspect of the electric storage apparatus according to the present invention, it may be configured that the electric storage apparatus is provided with a spacer arranged between adjacent electric storage devices, and the shielding member is formed integrally with the spacer.

In still another aspect of the electric storage apparatus according to the present invention, the electric storage apparatus is provided with a gasket or a rib arranged between a shielding member and an electric storage device.

In still another aspect of the electric storage device according to the present invention, it may be configured that the electric storage device is provided with: an electrode assembly including a positive electrode plate and a negative electrode plate insulated from each other; and a case for housing the electrode assembly, and the case is provided with: a case body including a first opening edge portion and a second opening edge portion in both ends thereof; a first cover plate for closing a first opening formed by the first opening edge portion; and a second cover plate for closing a second opening formed by the second opening edge portion, wherein at least one of the first cover plate and the second cover plate is a plate member in which the outer peripheral portion of the cover plate mates with the inner circumferential surface of one of the first opening edge portion and the second opening edge portion corresponding to the cover plate and which is convexed inwardly, and the outer peripheral portion and one of the first opening edge portion and the second opening edge portion corresponding to the cover plate having the aforesaid outer peripheral portion are joined to each other.

According to such a configuration as described above, the corresponding opening edge portion of the case body, when fitted into the cover plate including the outer peripheral portion, reshapes to fit the peripheral edge (peripheral edge shape) of the cover plate thus fitted into, even if the case body is deformed when the case is manufactured. As a result, the case body is corrected into a proper shape. In addition, under the condition of the cover plate including the outer peripheral portion being fitted into the corresponding opening edge portion of the case body, the shape stability of the case body is increased by the cover plate including the outer peripheral portion. Accordingly, it is possible to prevent the case body from being unexpectedly deformed.

In still another aspect of the electric storage device according to the present invention, it may be configured that the electric storage device is provided with: an electrode assembly including a positive electrode plate and a negative electrode plate insulated from each other; and a case for housing the electrode assembly, and the case is provided with: a case body including a first opening edge portion and a second opening edge portion in both ends thereof; a first cover plate for closing a first opening formed by the first opening edge portion; and a second cover plate for closing a second opening formed by the second opening edge portion, wherein a critical withstand pressure of one of the first cover plate and the second cover plate and the case body is made lower than a critical withstand pressure of the other of the first cover plate and the second cover plate and the case body.

According to such a configuration as described above, the joined portion between one of the cover plates and an opening edge portion corresponding to the cover plate is partially or totally destroyed if the internal pressure of the case exceeds a certain value. As a result, there is formed a passage for releasing the internal pressure of the case. That is, one of the cover plates functions as a gas exhaust valve.

In still another aspect of the electric storage apparatus according to the present invention, the electric storage apparatus may be provided with the above-described electric storage device; and a holding member for securely holding the electric storage device.

According to such a configuration as described above, the case body of the electric storage device is placed in a state of being pressurized (compressed). Accordingly, the case body swells and thereby reduces the internal pressure of the case if the internal pressure exceeds a certain value, and therefore, the joined portion between one of the first cover plate and the second cover plate and an opening edge portion corresponding to the cover plate is not destroyed. That is, it is possible to reduce the problem of, for example, the above-mentioned one cover plate failing to operate as a gas exhaust valve when the internal pressure becomes an expected value.

In still another aspect of the electric storage apparatus according to the present invention, it may be configured that the electric storage apparatus is provided with: a plurality of electric storage devices each of which includes an electrode assembly including a positive electrode plate and a negative electrode plate insulated from each other and a case for housing the electrode assembly and which align in a first direction; and a fixing member arranged between adjacent electric storage devices, and the case is provided with a case body including at least one opening edge portion; and a cover plate joined to the opening edge portion, wherein a mating portion which is the joined portion between the case body and the cover plate is formed by joining the case body and the cover plate, and the fixing member includes a pair of engaging portions engaged respectively with the mating portion of one of adjacent electric storage devices and the mating portion of the other of the adjacent electric storage devices.

According to such a configuration as described above, one of the adjacent electric storage devices and the fixing member are fixed (positioned in place).

Likewise, the other of the adjacent electric storage devices and the fixing member are fixed (positioned in place). As a result, the adjacent electric storage devices are fixed (positioned in place) through the fixing member. This configuration prevents any displacement between the adjacent electric storage devices and restricts the relative position of the plurality of electric storage devices.

As described above, according to the present invention, the gas exhaust valve is formed in a region farthest from the external terminals (the positive-electrode external terminal and the negative-electrode external terminal).

Accordingly, it is possible to suitably prevent constituents of a gas and an electrolytic solution discharged from the gas exhaust valve from adhering to the external terminals or the vicinity thereof when the gas exhaust valve operates.

Hereinafter, a battery cell which is one embodiment of the electric storage device according to the present invention and a battery module in which a plurality of the battery cells are aligned and integrated are described while referring to the accompanying drawings. Note that in the present embodiment, a lithium-ion secondary battery (hereinafter simply referred to as "battery cell") is described as one example of the battery cell.

Figure 2:
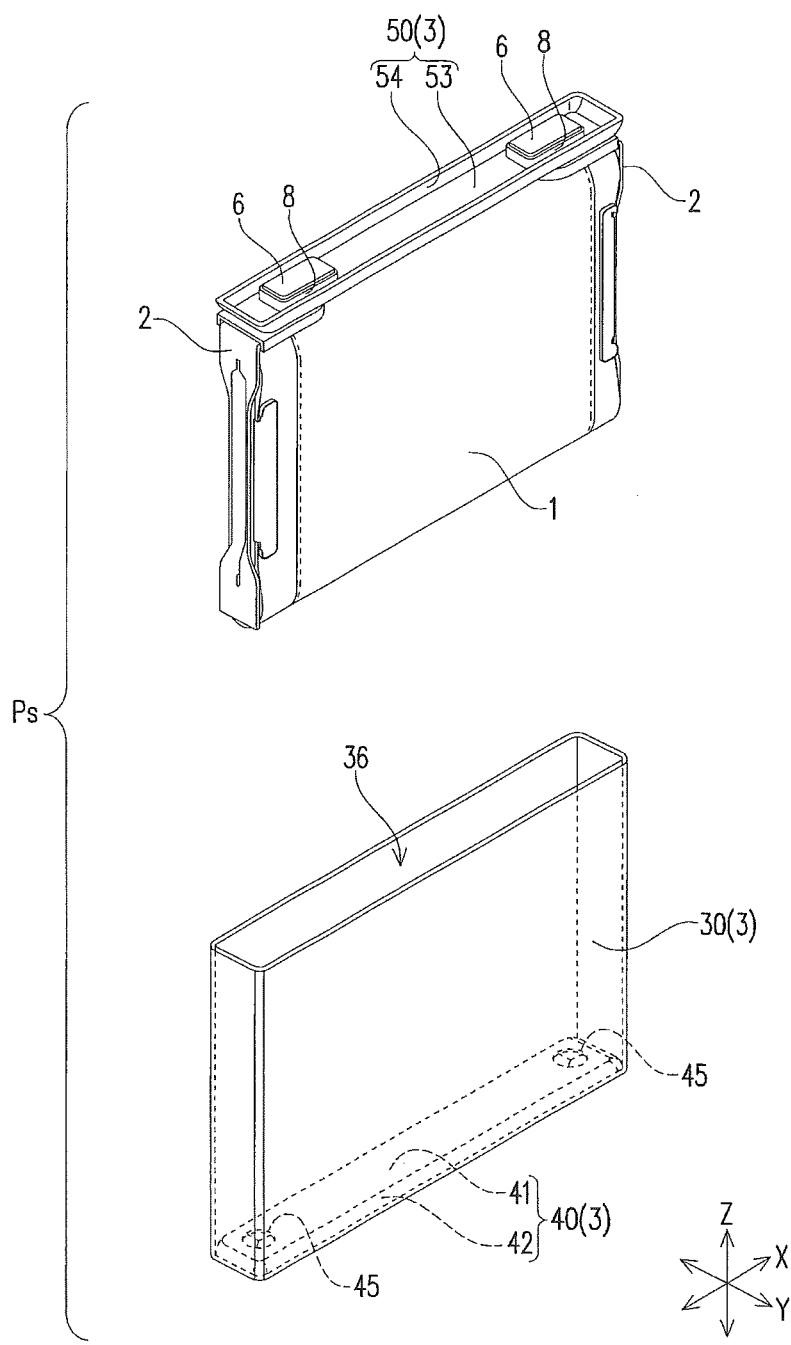
FIG. 2 is an exploded perspective view of the battery cell.
Figure 3:
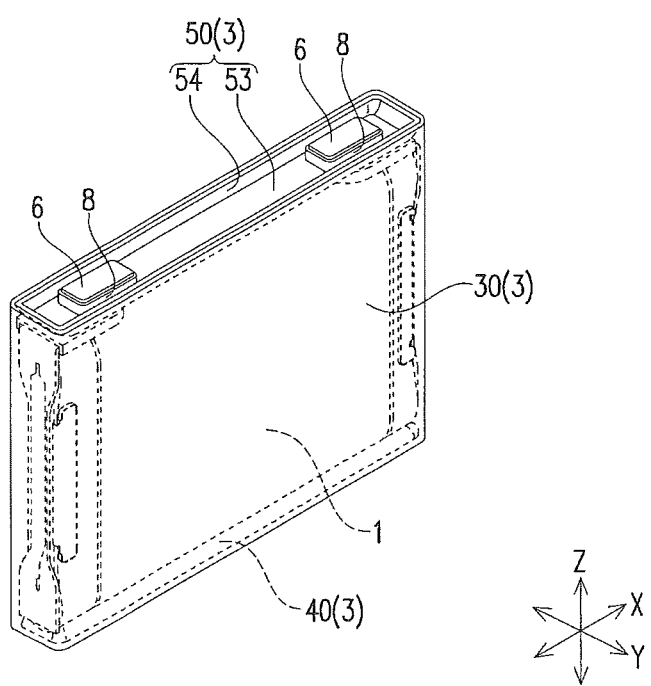
FIG. 3 is a perspective view of the battery cell.

As illustrated in FIGS. 1 to 3, a battery cell Ps according to the present embodiment is provided with an electrode assembly (power generating element) 1, a pair of current collectors 2, a case 3, a pair of external terminals 6, a pair of inner gaskets 7, and a pair of outer gaskets 8. The electrode assembly 1 includes a separator 12 having electric insulating properties and a positive electrode plate 13 and a negative electrode plate 15 holding the separator 12 therebetween. The pair of current collectors 2 are electrically connected to the positive electrode plate 13 and the negative electrode plate 15 of the electrode assembly 1 corresponding in polarity to the current collectors 2. The case 3 houses the electrode assembly 1 and the pair of current collectors 2. The pair of external terminals 6 are arranged outside the case 3. The pair of inner gaskets 7 are arranged along the inner surface of the case 3, so that each inner gasket 7 corresponds in location to the corresponding one of the pair of external terminals 6. The pair of outer gaskets 8 are arranged along the outer surface of the case 3, so that each outer gasket 8 corresponds in location to the corresponding one of the pair of external terminals 6.

The positive electrode plate 13, the negative electrode plate 15 and the separator 12 each are formed into a strip shape. The positive electrode plate 13, the negative electrode plate 15 and the separator 12 are stacked with the long sides thereof aligned. In addition, the positive electrode plate 13, the negative electrode plate 15 and the separator 12 are wound in the lengthwise direction thereof. Specifically, the positive electrode plate 13, the negative electrode plate 15 and the separator 12 are wound into a flattened shape. Accordingly, the shape of the electrode assembly 1 as viewed from the first direction (X direction in the figure) has a minor axis in a second direction (Y direction in the figure) orthogonal to the X direction and a major axis in a third direction (Z direction in the figure) orthogonal to the X and Y directions. That is, the electrode assembly 1 is provided with a pair of flat portions 10 opposed to each other in the Y direction, and a pair of curved portions (rounded turn sections) 11 connecting the end portions of the pair of flat portions 10 to each other.

In addition, the positive electrode plate 13 and the negative electrode plate 15 are stacked, while being relatively displaced in the X direction, and wound in the lengthwise direction. Accordingly, a positive-electrode lead portion 14 in which only the positive electrode plate 13 is layered is formed in one end portion of the electrode assembly 1 in the X direction. Likewise, a negative-electrode lead portion 16 in which only the negative electrode plate 15 is layered is formed in the other end portion of the electrode assembly 1 in the X direction.

Here, the positive electrode plate 13 is provided with positive-electrode active material layers (positive-electrode active material-coated parts) on both surfaces of a positive electrode current collecting substrate. This positive electrode plate 13 is formed, for example, by coating a positive-electrode active material coating on one surface of the positive electrode current collecting substrate made of strip-shaped aluminum foil, drying the coating, and then likewise coating the positive-electrode active material coating on the other surface of the positive electrode current collecting substrate and drying the coating. More particularly, the positive electrode plate 13 is provided with the positive electrode current collecting substrate and positive-electrode active material layers formed on both surfaces of the positive electrode current collecting substrate, except one end portion thereof, by, for example, coating the positive-electrode active material coating on both surfaces of the positive electrode current collecting substrate, except the one end portion thereof in the width direction thereof. Accordingly, one end portion of the positive electrode plate 13 serves as a portion (positive-electrode active material layer-unformed portion) where the positive electrode current collecting substrate is exposed. The positive-electrode lead portion 14 is composed of this positive-electrode active material layer-unformed part.

In addition, the negative electrode plate 15 is provided with negative-electrode active material layers (negative-electrode active material-coated portions) on both surfaces of a negative electrode current collecting substrate. This negative electrode plate 15 is formed, for example, by coating a negative-electrode active material coating on one surface of the negative electrode current collecting substrate made of strip-shaped copper foil, drying the coating, and then likewise coating the negative-electrode active material coating on the other surface of the negative electrode current collecting substrate and drying the coating. More particularly, the negative electrode plate 15 is provided with the negative electrode current collecting substrate and negative-electrode active material layers formed on both surfaces of the negative electrode current collecting substrate, except one end portion thereof, by, for example, coating the negative-electrode active material coating on both surfaces of the negative electrode current collecting substrate, except the one end portion thereof in the width direction thereof. Accordingly, one end portion of the negative electrode plate 15 is a portion (negative-electrode active material layer-unformed portion) where the negative electrode current collecting substrate is exposed. The negative-electrode lead portion 16 is composed of this negative-electrode active material layer-unformed portion.

Note that the positive-electrode lead portion 14 is bundled with a clip member 18. The negative-electrode lead portion 16 is also bundled with a clip member 18.

Each current collector 2 is formed by bending a metal plate. The current collector 2 is provided with a first connecting portion 20 arranged along the Z direction, and a second connecting portion 24 extending from the first connecting portion 20.

The first connecting portion 20 is provided with a connecting piece 21 extending in the X direction. The connecting piece 21 can be inserted into the winding center of an end portion of the electrode assembly 1 in the X direction. The connecting piece 21 is welded to the clip members 18. Consequently, the current collector 2 for positive polarity and the positive electrode plate 13 of the electrode assembly 1 (positive-electrode lead portion 14 of the electrode assembly 1) are electrically connected to each other. Likewise, the current collector 2 for negative polarity and the negative electrode plate 15 of the electrode assembly 1 (the negative-electrode lead portion 16 of the electrode assembly 1) are electrically connected to each other.

The second connecting portion 24 is fixed to the case 3 and electrically connected to corresponding one of the pair of external terminals 6. The second connecting portion 24 is flat, and is formed so as to be elongated in the X direction. The second connecting portion 24 has a through-hole 25 through which an external terminal 6 is inserted.

Now a description is made for a difference between the current collector 2 for positive polarity and the current collector 2 for negative polarity. In general, the current collector 2 for positive polarity is made of aluminum or an aluminum alloy and the current collector 2 for negative polarity is made of copper or a copper alloy from an electrochemical point of view. Consequently, the thickness of the positive-electrode current collector 2 is set so as to be larger than the thickness of the negative-electrode current collector 2 from the viewpoint of mechanical strength.

The case 3 is provided with a cylindrical case body 30 both ends of which are open, a first cover plate 40 for closing one of the openings of the case body 30, and a second cover plate 50 for closing the other opening (on the opposite side of the one opening) of the case body 30.

The case body 30 is formed into a rectangular cylindrical shape. Accordingly, the case body 30 is provided with a pair of first wall portions 31 each of which includes a first end portion P1 and a second end portion P2 on the opposite side of the first end portion P1, and a pair of second wall portions 32 each of which includes a first end portion P3 and a second end portion P4 on the opposite side of the first end portion P3. The pair of first wall portions 31 are opposed to each other at an interval in the X direction. In addition, the pair of second wall portions 32 are opposed to each other at an interval in the Y direction between the pair of first wall portions 31. Consequently, a first opening 34 is formed in a region surrounded by the first end portions P1 of the pair of first wall portions 31 and the first end portions P3 of the pair of second wall portions 32 (the first opening edge portion 33 of the case body 30). In addition, a second opening 36 is formed in a region surrounded by the second end portions P2 of the pair of first wall portions 31 and the second end portions P4 of the pair of second wall portions 32 (the second opening edge portion 35 of the case body 30).

In the present embodiment, the case body 30 is formed into a rectangular cylindrical shape the cross section of which is rectangular. The cross-sectional shape is a rectangular shape having a long side in the X direction and a short side in the Y direction. Accordingly, each first wall portion 31 has a rectangular shape having a long side in the Z direction. Likewise, each second wall portion 32 has a rectangular shape having a long side in the X direction. In addition, the first opening edge portion 33 and the second opening edge portion 35 each have a rectangular shape having a long side in the X direction. Note however that the connecting portion between each first wall portion 31 and each second wall portion 32 is formed into a circular-arc planar shape. Accordingly, the corner portions of the case body 30 are rounded to have a small radius of curvature. The first opening edge portion 33 and the second opening edge portion 35 each therefore have a rectangular shape the corner portions of which are rounded.

Note that the case body 30 is formed by means of, for example, extrusion. By forming the case body 30 by means of extrusion, it is possible to easily make the wall thickness of the case body 30 smaller than the wall thickness of a conventional case body formed by means of deep drawing. In addition, productivity is improved since the case body 30 is available simply by cutting an extruded plate member.

The first cover plate 40 close the first opening 34. This first cover plate 40 serves as the bottom portion of the case 3 when the case 3 is arranged so that the first cover plate 40 is on the lower side. The second cover plate 50 close the second opening 36. This second cover plate 50 serves as the top portion of the case 3 when the case 3 is arranged so that the first cover plate 40 is on the lower side. All of the case body 30, the first cover plate 40 and the second cover plate 50 are made of metal (for example, aluminum or an aluminum alloy). As the result of the first cover plate 40 and the second cover plate 50 being welded to the case body 30, an internal space is formed to be airtight within the case 3.

Figure 4:
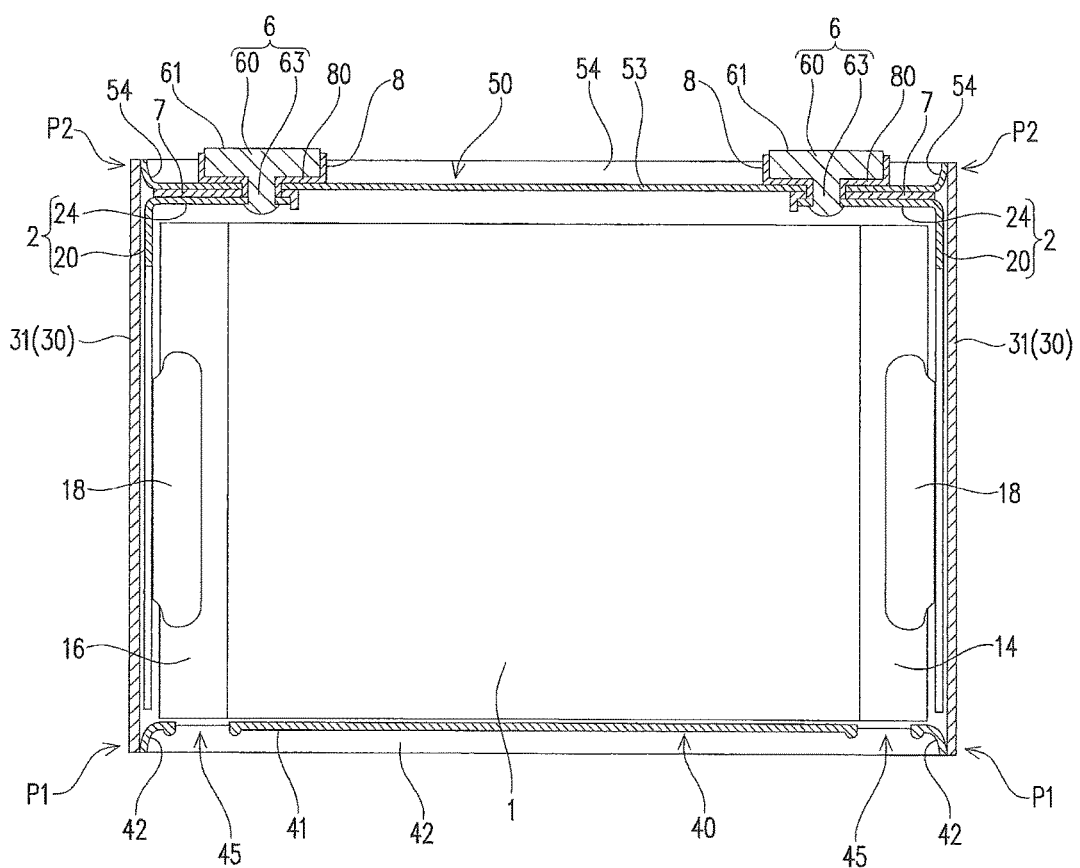
FIG. 4 is a cross-sectional view of the battery cell cut along the lengthwise direction thereof.
Figure 5:
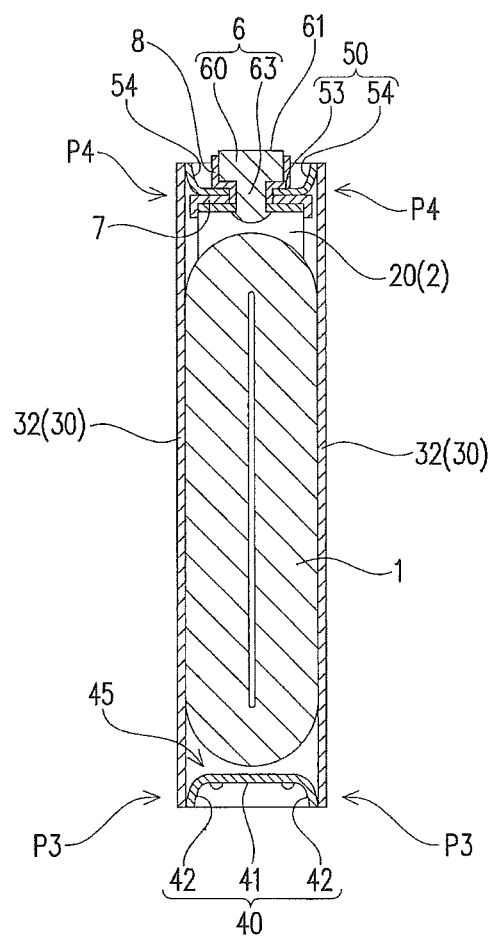
FIG. 5 is a cross-sectional view of the battery cell cut along the widthwise direction thereof.

As illustrated in FIGS. 4 and 5, the first cover plate 40 is provided with a base portion 41, and an outer peripheral portion 42 surrounding the base portion 41. The base portion 41 is flat. The outer peripheral portion 42 rises from the peripheral edge of the base portion 41. More particularly, the base portion 41 is rectangular or substantially rectangular in conformity with the first opening edge portion 33 being rectangular or substantially rectangular. This base portion 41 is smaller in shape than the first opening edge portion 33. In addition, the base portion 41 is located in a position displaced inward into the case body 30 from the end edge of the first opening edge portion 33. The peripheral edge of the outer peripheral portion 42 rising from the peripheral edge of the base portion 41 is rectangular or substantially rectangular in conformity with the shape of the first opening edge portion 33. More particularly, the peripheral edge of the outer peripheral portion 42 has a shape in conformity to the inner circumferential surface of the first opening edge portion 33. That is, the peripheral edge of the outer peripheral portion 42 is shaped to mate with the inner circumferential surface of the first opening edge portion 33.

Figure 6:
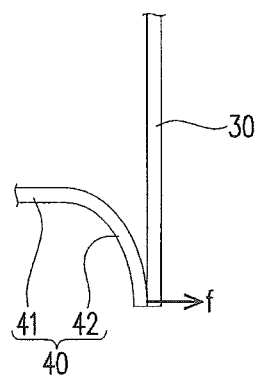
FIG. 6 is a conceptual view in which a cover member is fitted into the opening edge portion of a case body, and the peripheral edge of the cover member is mated with the end edge of the opening edge portion.

The standing height (Z-direction height) of the outer peripheral portion 42 is uniform over the entire circumference thereof. Accordingly, the peripheral edge of the outer peripheral portion 42 is parallel with the planar surface of the base portion 41. Under the condition of the first cover plate 40 being fitted into the first opening edge portion 33, the peripheral edge of the outer peripheral portion 42 (the peripheral edge of the first cover plate 40) is mated with the end edge of the first opening edge portion 33, as illustrated in FIG. 6. At this time, the peripheral edge of the outer peripheral portion 42 has a shape in conformity to the inner circumferential surface of the first opening edge portion 33, as described above. The peripheral edge of the first cover plate 40 and the end edge of the first opening edge portion 33 therefore have close contact with each other over the entire circumference thereof. Consequently, the case body 30, even if deformed inward at a point in time before the first cover plate 40 is fitted into the first opening edge portion 33, is corrected into a proper shape in response to a force f from the first cover plate 40, as the result of the first cover plate 40 being fitted into the first opening edge portion 33.

Figure 7:
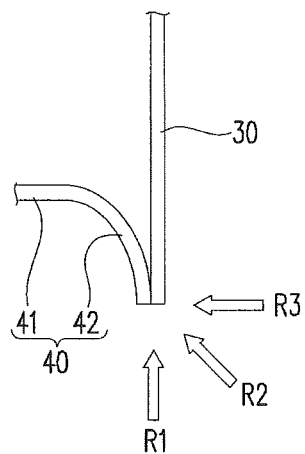
FIG. 7 is a conceptual view in which the peripheral edge of the cover member and the end edge of the opening edge portion are ready to be laser-welded.

The outer peripheral portion 42 is formed into a circular-arc shape. More particularly, the outer peripheral portion 42 curves until intersecting with the base portion 41 at right or substantially right angles. Accordingly, the peripheral edge of the first cover plate 40 has surface contact with the inner circumferential surface of the first opening edge portion 33 within a predetermined range. As illustrated in FIG. 7, laser light for laser welding is radiated toward the mating portion between the peripheral edge of the first cover plate 40 and the end edge of the first opening edge portion 33. The laser light may be radiated from a front direction (the direction of reference character R1) to the mating portion between the peripheral edge of the first cover plate 40 and the end edge of the first opening edge portion 33. Alternatively, the laser light may be radiated from an oblique direction (the direction of reference character R2) to the mating portion. Yet alternatively, the laser light may be radiated from a lateral direction (the direction of reference character R3) to the mating portion. Note however that no gaps are present in the mating portion between the peripheral edge of the first cover plate 40 and the end edge of the first opening edge portion 33. Accordingly, the laser light, even if radiated from the R1 direction, does not go through the mating portion into the case 3. Consequently, the laser light is securely radiated to the mating portion between the peripheral edge of the first cover plate 40 and the end edge of the first opening edge portion 33, thus making an excellent welding state available. In this regard, the R1 direction is more preferable as the direction of laser light radiation.

Figure 8:
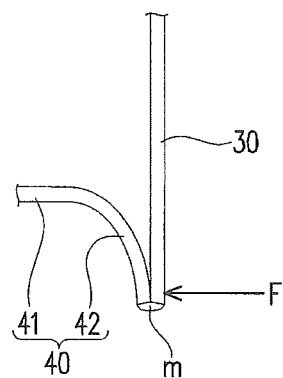
FIG. 8 is a conceptual view in which the peripheral edge of the cover member and the end edge of the opening edge portion are welded to integrally combine the case body and the cover member.

The first cover plate 40 is made large in cross-sectional moment and high in rigidity by the outer peripheral portion 42 rising from the base portion 41. Accordingly, the case 3 is less likely to become deformed even if an external force F is applied from the first opening edge portion 33 side to the case 3 after the peripheral edge of the first cover plate 40 and the end edge of the first opening edge portion 33 are welded to each other (reference character m in FIG. 8). Thus, the first cover plate 40 is convexed, more particularly, shaped into a convex surface convexed inwardly of the case body 30, thus significantly contributing to the shape stability (form stability) of the case 3.

Note that the first cover plate 40 is formed by pressing or drawing a flat plate member. The wall thickness of the first cover plate 40 may be the same as the wall thickness of the case body 30. Alternatively, the wall thickness of the first cover plate 40 may be smaller, or larger, than the wall thickness of the case body 30. The wall thickness of the first cover plate 40 is selected according to rigidity that the first cover plate 40 should express.

Here, as illustrated in FIGS. 1 to 5, the first cover plate 40 is provided with gas exhaust valves 45 for releasing the internal pressure of the case 3 by means of rupture or cleavage, if the internal pressure of the case 3 exceeds a certain value. The gas exhaust valves 45 are structured by, for example, thinning part of the first cover plate 40 (and forming half-cut lines in addition) to the extent of being cleaved by an increased internal pressure of the case 3.

The first cover plate 40 of the present embodiment is provided with a pair of gas exhaust valves 45 arranged at an interval in the X direction. One of the pair of gas exhaust valves 45 is formed in one end portion of the base portion 41 of the first cover plate 40. In addition, the other of the pair of gas exhaust valves 45 is formed in the other end portion of the base portion 41 of the first cover plate 40. Accordingly, the one of the gas exhaust valves 45 is positioned in one end portion of the bottom portion of the case 3 in the X direction when the case 3 is arranged so that the first cover plate 40 is on the lower side. Likewise, the other of gas exhaust valves 45 is positioned in the other end portion of the bottom portion of the case 3 in the X direction. The one gas exhaust valve 45 is opposed to the positive-electrode lead portion 14 (the curved portion 11 thereof) of the electrode assembly 1. Likewise, the other gas exhaust valve 45 is opposed to the negative-electrode lead portion 16 (the curved portion 11 thereof) of the electrode assembly 1.

The second cover plate 50 is basically the same in configuration as the first cover plate 40. That is, the second cover plate 50 is provided with a base portion 53, and an outer peripheral portion 54 surrounding the base portion 53. The base portion 53 is flat. The outer peripheral portion 54 rises from the peripheral edge of the base portion 53. More particularly, the base portion 53 is rectangular or substantially rectangular in conformity with the second opening edge portion 35 being rectangular or substantially rectangular. This base portion 53 is smaller in shape than the second opening edge portion 35. In addition, the base portion 53 is located in a position displaced inward into the case body 30 from the end edge of the second opening edge portion 35. The peripheral edge of the outer peripheral portion 54 rising from the peripheral edge of the base portion 53 is rectangular or substantially rectangular in conformity with the shape of the second opening edge portion 35. More particularly, the peripheral edge of the outer peripheral portion 54 has a shape in conformity to the inner circumferential surface of the second opening edge portion 35. That is, the peripheral edge is shaped so as to mate with the inner circumferential surface of the second opening edge portion 35.

The standing height (Z-direction height) of the outer peripheral portion 54 is uniform over the entire circumference thereof. Accordingly, the peripheral edge of the outer peripheral portion 54 is parallel with the planar surface of the base portion 53. Under the condition of the second cover plate 50 being fitted into the second opening edge portion 35, the peripheral edge of the outer peripheral portion 54 (the peripheral edge of the second cover plate 50) is mated with the end edge of the second opening edge portion 35. At this time, the peripheral edge of the outer peripheral portion 54 has a shape in conformity to the inner circumferential surface of the second opening edge portion 35, as described above. The peripheral edge of the second cover plate 50 and the end edge of the second opening edge portion 35 therefore have close contact with each other over the entire circumference thereof. Consequently, the case body 30, even if deformed inward at a point in time before the second cover plate 50 is fitted into the second opening edge portion 35, is corrected into a proper shape in response to a force from the second cover plate 50, as the result of the second cover plate 50 being fitted into the second opening edge portion 35.

The outer peripheral portion 54 is formed into a circular-arc shape. More particularly, the outer peripheral portion 54 curves until intersecting with the base portion 53 at right or substantially right angles. Accordingly, the peripheral edge of the second cover plate 50 has surface contact with the inner circumferential surface of the second opening edge portion 35 within a predetermined range. Laser light for laser welding is radiated toward the mating portion between the peripheral edge of the second cover plate 50 and the end edge of the second opening edge portion 35. The laser light may be radiated from a front direction with respect to the mating portion between the peripheral edge of the second cover plate 50 and the end edge of the second opening edge portion 35. Alternatively, the laser light may be radiated from an oblique direction to the mating portion. Yet alternatively, the laser light may be radiated from a lateral direction to the mating portion. Note however that no gaps are present in the mating portion between the peripheral edge of the second cover plate 50 and the end edge of the second opening edge portion 35. Accordingly, the laser light, even if radiated from the front direction, does not go through the mating portion into the case 3. Consequently, the laser light is securely radiated to the mating portion between the peripheral edge of the second cover plate 50 and the end edge of the second opening edge portion 35, thus making an excellent welding state available. In this regard, the front direction is more preferable as the direction of laser light radiation.

The second cover plate 50 is made large in cross-sectional moment and high in rigidity by the outer peripheral portion 54 rising from the base portion 53. Accordingly, the case 3 is less likely to become deformed even if an external force is applied from the second opening edge portion 35 side to the case 3 after the peripheral edge of the second cover plate 50 and the end edge of the second opening edge portion 35 are welded to each other. Thus, the second cover plate 50 is convexed, more particularly, shaped into a convex surface convexed inwardly of the case body 30, thus significantly contributing to the shape stability (form stability) of the case 3.

Note that the second cover plate 50 is formed by pressing or drawing a flat plate member. The wall thickness of the second cover plate 50 may be the same as the wall thickness of the case body 30. Alternatively, the wall thickness of the second cover plate 50 may be smaller, or larger than the wall thickness of the case body 30. The wall thickness of the second cover plate 50 is selected according to rigidity that the second cover plate 50 should express.

The second cover plate 50 includes a pair of through-holes 51 arranged at an interval in the X direction. One of the through-holes 51 is formed in one end portion of the second cover plate 50 in the X direction. The other through-hole 51 is formed in the other end portion of the second cover plate 50 in the X direction.

Each external terminal 6 is provided with a body 60, and a caulking part 63 protruding from the body 60. The body 60 includes a planar surface 61. A bus bar is placed on the planar surface 61, and the bus bar and the external terminal 6 are welded to each other. That is, each external terminal 6 is a welded-type external terminal. The body 60 is formed so as to have a width narrower than the width (Y-direction width) of the second cover plate 50. The body 60 has a rectangular solid shape elongated in the X direction. The caulking part 63 is structured so that at least a leading-end side thereof is plastic-deformable (caulking-treatable). The caulking part 63 protrudes from the center of a surface of the body 60 facing the second cover plate 50.

Each inner gasket 7 has electric insulating properties and sealability. The inner gasket 7 is a synthetic-resin molded part. The inner gasket 7 is sized so as to be able to face the entirety of the second connecting portion 24 of the current collector 2. The inner gasket 7 includes a through-hole 70 corresponding to the through-hole 25 of the second connecting portion 24.

Like the inner gasket 7, each outer gasket 8 has electric insulating properties and sealability. The outer gasket 8 is a synthetic-resin molded part. The outer gasket 8 is provided with a concave portion 80 for receiving the body 60 of the external terminal 6. The outer gasket 8 includes a through-hole 81 through which the caulking part 63 of the external terminal 6 is inserted under the condition of the body 60 of the external terminal 6 being housed in the concave portion 80.

Note that the standing height (Z-direction height) of the outer peripheral portion 54 of the second cover plate 50 from the base portion 53 thereof may be the same as the standing height of the outer peripheral portion 42 of the first cover plate 40 from base portion 41 thereof. Alternatively, the standing height of the outer peripheral portion 54 of the second cover plate 50 from the base portion 53 thereof may be larger, or smaller than the standing height of the outer peripheral portion 42 of the first cover plate 40 from base portion 41 thereof. Note however that the upper end face of the outer wall portion of the outer gasket 8 is preferably formed to a height at which the upper end face protrudes outward from the peripheral edge of the second cover plate 50, so that the creepage distance between the base portion 53 (or the outer peripheral portion 54) of the second cover plate 50 and the external terminal 6 is made large.

The caulking part 63 of the external terminal 6 is serially inserted through the through-hole 81 of the outer gasket 8, the through-hole 51 of the second cover plate 50, the through-hole 70 of the inner gasket 7, and the through-hole 25 of the second connecting portion 24 of the current collector 2. Then, a caulking-treatment is performed on the leading end portion of the caulking part 63 protruding inward from the second connecting portion 24 of the current collector 2. Consequently, the external terminal 6 is integrated with the second cover plate 50 and electrically connected to the current collector 2, while being insulated from the second cover plate 50 by the outer gasket 8 and the inner gasket 7.

In the battery cell Ps according to the present embodiment configured as described above, the case 3 is fabricated by forming the case body 30 by means of extrusion and welding the cover plates 40 and 50 to the opening edge portions 33 and 35 on both sides of the case body 30. Accordingly, the case 3 can be fabricated at lower cost, compared with a conventional case fabricated by forming a case body by means of deep drawing and welding a cover plate to the opening edge portion of one end of the case body. As a result, it is possible to reduce the manufacturing cost of the battery cell Ps. In addition, the case 3 can be fabricated with a high degree of freedom in shape, compared with fabrication by deep drawing. This increases the degree of design freedom of the case 3, and consequently, the degree of design freedom of the battery cell Ps.

According to the battery cell Ps of the present embodiment, the case body 30 is formed by means of extrusion. It is therefore possible to reduce the wall thickness of the case body 30. Consequently, it is possible to reduce the weight of the battery cell Ps according to the present embodiment, compared with a conventional battery cell. In addition, the battery cell Ps according to the present embodiment enables reduction in the volume of components not contributing to electric generation (for example, the case 3) by decreasing the wall thickness of the case body 30. Consequently, in the battery cell Ps according to the present embodiment, it is possible to enhance power generation efficiency (energy density) per unit volume.

If the wall thickness of the case body 30 is reduced, the rigidity of the case body 30 decreases in general. As a result, the case body 30 becomes liable to deformation. In the case of battery cell Ps of the present embodiment, however, not only the second cover plate 50 but also the first cover plate 40 in particular ensures the shape stability of the case body 30 as means for retaining the shape of the case body 30.

Consequently, it is possible to reduce or prevent a significant degradation in the rigidity of the case 3 even if the case body 30 is reduced in wall thickness. Since the case body 30 is protected by the first cover plate 40 from loss of shape, it is possible to prevent the electrode assembly 1 from unexpectedly hitting against the second opening edge portion 35 and thus becoming scratched or damaged when the electrode assembly 1 is inserted from the second opening 36 of the case body 30. In addition, it is possible to prevent any gap from being created between the peripheral edge of the second cover plate 50 closing the second opening 36 and the end edge of the second opening edge portion 35. Consequently, it is possible to prevent laser light from going through the gap into the case 3 when the second cover plate 50 is welded to the second opening edge portion 35, and the electrode assembly 1 inside the case 3 from becoming damaged. That is, the first cover plate 40 ensures the shape stability of the case body 30, thereby ensuring the planarity of the end edge of the second opening edge portion 35. Any gaps are thus prevented from being created between the peripheral edge of the second cover plate 50 and the end edge of the second opening edge portion 35.

The peripheral edge of the first cover plate 40 has a shape in conformity to the inner circumferential surface of the first opening edge portion 33 of the case body 30. Accordingly, the end edge of the first opening edge portion 33 of the case body 30 is placed in close contact with the peripheral edge of the first cover plate 40 when the first cover plate 40 is fitted into the first opening edge portion 33. In addition, the first cover plate 40 is higher in rigidity than the case body 30. Accordingly, even if the case body 30 is deformed before the first cover plate 40 is fitted into the first opening edge portion 33, the first opening edge portion 33 reshapes to fit the peripheral edge of the first cover plate 40 as the result of the first cover plate 40 being fitted into the first opening edge portion 33. As a result, the case body 30 is corrected into a proper shape.

According to the battery cell Ps of the present embodiment, a high degree of adhesion is provided between the peripheral edge of the first cover plate 40 and the end edge of the first opening edge portion 33 of the case body 30 and between the peripheral edge of the second cover plate 50 and the end edge of the second opening edge portion 35 of the case body 30. Accordingly, laser light, even if radiated from the front direction (i.e., the Z direction) to the mating portion between each two edges, does not go through the mating portion into the case 3. Consequently, the laser light can be securely radiated to the mating portions between the peripheral edge of the first cover plate 40 and the end edge of the first opening edge portion 33 and between the peripheral edge of the second cover plate 50 and the end edge of the second opening edge portion 35. As a result, an excellent welding state is available. Note that there is no need to be so sensitive about the penetration of laser light as long as the laser light is radiated from the oblique direction (see reference character R2 in FIG. 7). This way of welding requires a mechanism for changing and adjusting the angle of inclination of a welding head for emitting laser light, however, thus causing welding equipment to be large-scale. Furthermore, the welding head is required to rotate around a Z-axis, while moving along an XY plane, in order to weld the mating portions between the peripheral edge of the first cover plate 40 and the end edge of the first opening edge portion 33 and between the peripheral edge of the second cover plate 50 and the end edge of the second opening edge portion 35 over the entire circumferences of the mating portions. This requirement complicates a machining program to be used to control that motion. Accordingly, there is a problem of consuming time and cost in creating the machining program. There is no problem of the penetration of laser light at all, if the laser light is radiated from the lateral direction (see reference character R3 in FIG. 7). However, there is a possibility of failing to correctly radiate the laser light to the mating portions between the peripheral edge of the first cover plate 40 and the end edge of the first opening edge portion 33 and between the peripheral edge of the second cover plate 50 and the end edge of the second opening edge portion 35. In the method of radiating the laser light in the oblique direction, however, the laser light hitting against an object does not reflect back to the welding head and is, therefore, preferable for the welding equipment. In the method of radiating the laser light from the lateral direction, it is possible to appropriately weld the mating portions by increasing output power. In conclusion, the direction of laser light radiation is selected as appropriate, according to the situation.

In the battery cell Ps according to the present embodiment, the outer peripheral portion 42 of the first cover plate 40 curves until intersecting with the base portion 41 at right or substantially right angles. Likewise, the outer peripheral portion 54 of the second cover plate 50 curves until intersecting with the base portion 53 at right or substantially right angles. Accordingly, the peripheral edge of the first cover plate 40 has surface contact with the inner circumferential surface of the first opening edge portion 33 within a predetermined range. Likewise, the peripheral edge of the second cover plate 50 has surface contact with the inner circumferential surface of the second opening edge portion 35 within a predetermined range. Consequently, it is possible to further increase the joining strength between the first opening edge portion 33 and the first cover plate 40 and the joining strength between the second opening edge portion 35 and the second cover plate 50.

The gas exhaust valves 45 of the battery cell Ps according to the present embodiment are arranged on a surface of the case 3 on the opposite side of the surface on which the external terminals 6 are arranged. That is, whereas the external terminals 6 are arranged in the second cover plate 50, the gas exhaust valves 45 are arranged in the first cover plate 40 located on the opposite side of the second cover plate 50. Accordingly, the external terminals 6 and the gas exhaust valves 45 are positioned directly opposite to each other in the case 3. Consequently, the gas exhaust valves 45 are located in places farthest from the external terminals 6 in the case 3. Accordingly, it is possible to prevent constituents of a gas discharged from the gas exhaust valves 45, or an electrolytic solution discharged therefrom as the gas is discharged, from adhering to the external terminals 6 and the vicinity thereof (for example, a bus bar connected to the external terminals 6, electric power lines or signal lines connected to the external terminals 6 or the bus bar) when the gas exhaust valves 45 operate.

Assume that the gas exhaust valves 45 are formed in the case body 30, i.e., the gas exhaust valves 45 are arranged in regions lateral to the external terminals 6. Even in this case, the gas exhaust valves are arranged in places distant from the external terminals 6. If the case 3 is arranged so that the gas exhaust valves 45 are located above the external terminals 6, however, the electrolytic solution discharged from the gas exhaust valves 45 trickles down through surfaces of the case body 30 when the gas exhaust valves 45 operate. Consequently, the electrolytic solution discharged from the gas exhaust valves 45 may adhere to the external terminals 6 or the vicinity thereof. In the battery cell Ps according to the present embodiment, the gas exhaust valves 45 are located in places farthest from the external terminals 6. In addition, two orthogonal places (corner portions) are present in paths from the gas exhaust valves 45 to the external terminals 6 on surfaces of the case 3. Accordingly, even if the electrolytic solution discharged from the gas exhaust valves 45 trickles down, the electrolytic solution is extremely unlikely to reach the external terminals 6. Thus, the battery cell Ps according to the present embodiment has prominent advantageous effects, in addition to effects achieved by arranging the gas exhaust valves 45 in places distant from the external terminals 6.

Furthermore, the gas exhaust valves 45 are arranged in the base portion 41 located in a position of the first cover plate 40 displaced inward into the case body 30 from the end edge of the first opening edge portion 33 of the case body 30. That is, the gas exhaust valves 45 are surrounded by the outer peripheral portion 42 of the first cover plate 40 and the first opening edge portion 33 of the case body 30. Accordingly, gas diffusion is restricted by the outer peripheral portion 42 of the first cover plate 40 and the first opening edge portion 33 of the case body 30 when the gas exhaust valves 45 operate.

In addition, the gas exhaust valves 45 are positioned inside the outlines of the case 3 as the result of being arranged in the base portion 41 positioned inward into the case body 30 in the first cover plate 40 from the end edge of the first opening edge portion 33 of the case body 30. Accordingly, the gas exhaust valves 45 do not contact with a plane in which the battery cell Ps is placed, even if the battery cell Ps is arranged in place. Consequently, it is possible to prevent the occurrence of such a situation in which the gas exhaust valves 45 unexpectedly receive an external force and become weakened, thus being enabled by a force smaller than an expected force.

Yet additionally, the gas exhaust valves 45 are arranged in the vicinity of the positive-electrode lead portion 14 and the negative-electrode lead portion 16 in the case 3. A gas is generated inside the electrode assembly 1 and escapes out of the positive-electrode lead portion 14 and the negative-electrode lead portion 16 which are open ends. Accordingly, an exhaust passage formed within the case 3 shortens (becomes shortest) if the gas exhaust valves 45 are arranged in the vicinity of the positive-electrode lead portion 14 and the negative-electrode lead portion 16 in the case 3, thus smoothing the discharge of the gas.

The battery cell Ps according to the present embodiment includes the case 3 provided with the case body 30 including the first opening edge portion 33 and the second opening edge portion 35 on both sides thereof; the first cover plate 40 for closing the first opening 34 formed by the first opening edge portion 33; and a second cover plate 50 for closing the second opening 36 formed by the second opening edge portion 35. At least one of the first cover plate 40 and the second cover plate 50 is a plate member in which the outer peripheral portions of the cover plates 40 and 50 mate with the inner circumferential surfaces of the opening edge portions 33 and 35 corresponding to the cover plates 40 and 50 and which is convexed inwardly of the case body 30. At least one of the outer peripheral portions of the first cover plate 40 and the second cover plate 50 is joined to the corresponding at least one of the first opening edge portion 33 and the second opening edge portion 35. Consequently, even if the case body 30 is deformed when the case 3 is manufactured, the opening edge portions 33 and 35 reshape to fit the peripheral edge (peripheral edge shape) of the cover plates 40 and 50 when the cover plates 40 and 50 are fitted into the corresponding opening edge portions 33 and 35 of the case body 30. As a result, the case body 30 is corrected into a proper shape. In addition, under the condition of the cover plates 40 and 50 being fitted into the corresponding opening edge portions 33 and 35 of the case body 30, the shape stability of the case body 30 is increased by the cover plates 40 and 50. Accordingly, it is possible to prevent the case body 30 from being unexpectedly deformed.

Figure 9:
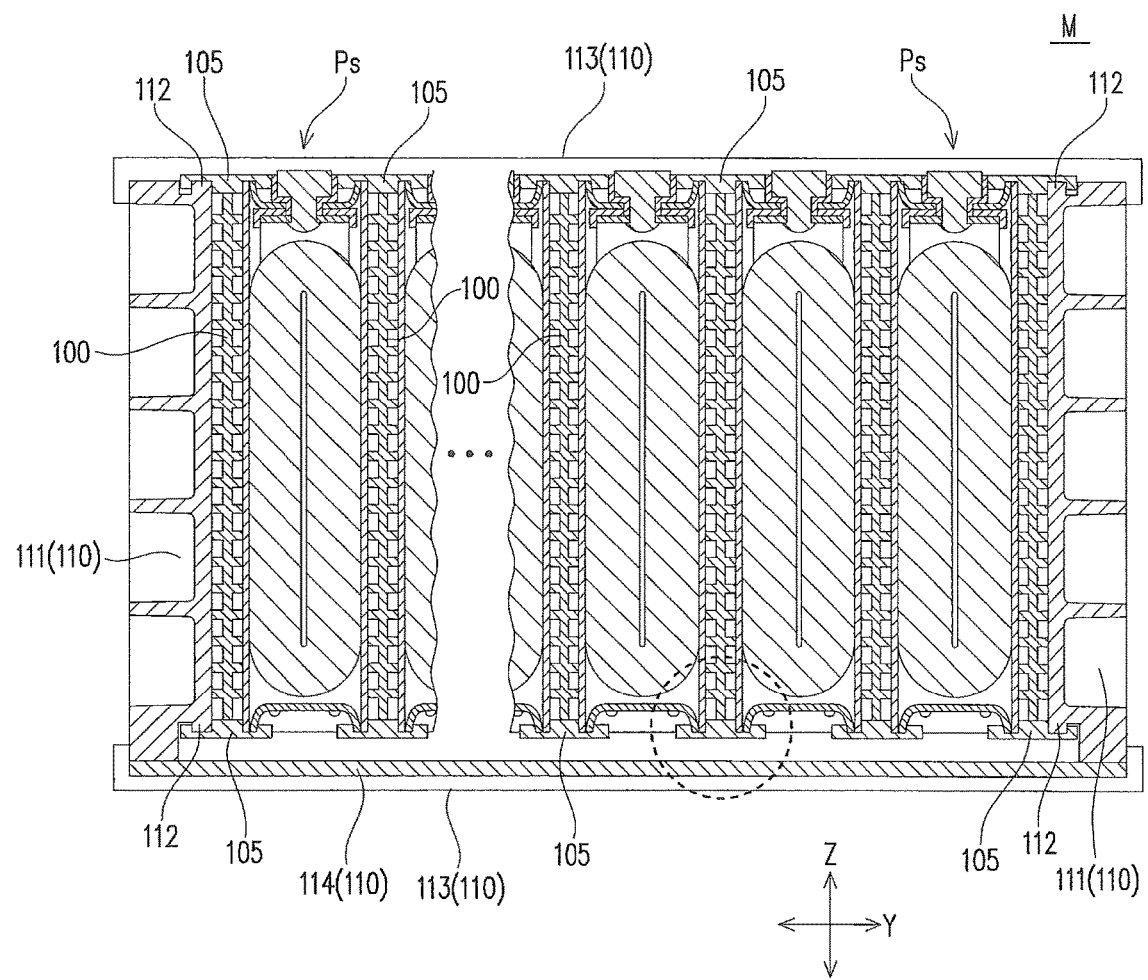
FIG. 9 is a cross-sectional view of a battery module cut along the direction in which a plurality of the battery cells are aligned.

Next, a battery module in which battery cells Ps according to the present embodiment are aligned in one direction (first direction) and integrated will be described while referring to FIGS. 9 and 10. Note that a circular dashed line in FIG. 9 is intended to indicate a region to be shown in enlarged view in FIG. 10, and is not a line for illustrating the configuration of the battery module M.

The battery module M according to the present embodiment is provided with a plurality of battery cells Ps aligned in the Y direction; a plurality of spacers 100 respectively arranged between adjacent battery cells Ps and on both sides of the plurality of battery cells Ps in the Y direction; and a frame 110 serving as a holding member for holding and packaging the plurality of battery cells Ps and the plurality of spacers 100.

The spacers 100 are made of synthetic resin. In addition, the spacers 100 have electric insulating properties. In the battery module M according to the present embodiment, a so-called air-cooling system in which the battery cells Ps are cooled as the result of air flowing between adjacent battery cells Ps and between the adjacent battery cells Ps and each terminating member 111 (to be described later) is adopted as a method of cooling the battery cells Ps. Accordingly, the spacers 100 have such a structure as to include gaps formed between adjacent battery cells Ps and between the adjacent battery cells Ps and each terminating member 111. Each spacer 100 of the present embodiment includes a plate-shaped spacer body and a plurality of helical convex threads protruding at intervals from one another out of the front and back surfaces of the spacer body, though the spacer is not limited to this structure. For example, the spacer is selected, as appropriate, from among spacers having various structures, including a spacer in which a plurality of helical convex threads protruding at intervals from one another out of one surface of the plate-shaped spacer body and a spacer in which the cross-sectional shape of a spacer body is a rectangular wave shape.

Adjacent battery cells Ps and the adjacent battery cells Ps and each terminating member 111 are respectively coupled with each other by fixing members 105. The fixing members 105 are arranged on one and the other end sides of each battery cell Ps in the Z direction. Each fixing member 105 is formed so as to be elongated along the X direction. Each fixing member 105 is slightly shorter than the distance between a pair of first wall portions 31 of the case 3 of each battery cell Ps. More particularly, the length of each fixing member 105 is the same or substantially the same as the length in the X direction of the second wall portion 32, except the rounded corner portions of each case body 30. Note that as described above, the corner portions of each case body 30 are rounded to have a small radius of curvature. The rounded turn portions (i.e., the corner portions) are thus negligible or not substantial in size. The length of each fixing member 105 is, therefore, substantially the same as the length in the X direction of the second wall portion 32.

Each fixing member 105 is provided with a pair of groove portions 106 arranged at an interval in the Y direction, and a convex portion 107 positioned between the pair of groove portions 106. Each groove portion 106 extends in the lengthwise direction of the fixing member 105, i.e., in the X direction. That is, each groove portion 106 extends from one end to the other end of the fixing member 105 in the lengthwise direction thereof. The convex portion 107 is formed in the same way as each groove portion 106.

The mating portion between the peripheral edge of the first cover plate 40 and the end edge of the first opening edge portion 33 in the battery cell Ps, the mating portion between the peripheral edge of the second cover plate 50 and the end edge of the second opening edge portion 35 in the battery cell Ps, or a convex portion 112 formed in the end portion in the Z direction of the terminating member 111 along the X direction fits into the groove portion 106.

The convex portion 107 of each fixing member 105 has a width equal to or slightly smaller than the width in the Y direction of each spacer 100. This convex portion 107 is an insertion part interposed between adjacent battery cells Ps and between a battery cell Ps and a terminating member 111 adjacent to each other.

Accordingly, the mating portion between the peripheral edge of the first cover plate 40 and the end edge of the first opening edge portion 33 in one of the adjacent battery cells Ps fits into one of the groove portions 106 of the fixing member 105 arranged on the first cover plate 40 side. Likewise, the mating portion between the peripheral edge of the first cover plate 40 and the end edge of the first opening edge portion 33 in the other of the adjacent battery cells Ps fits into the other groove portion 106. In addition, the convex portion 107 is interposed between the end portions of adjacent cases 3 on the first cover plate 40 side. By this configuration, the adjacent battery cells Ps are coupled with each other. In addition, the mating portion between the peripheral edge of the second cover plate 50 and the end edge of the second opening edge portion 35 in one of the adjacent battery cells Ps fits into one of the groove portions 106 of the fixing member 105 arranged on the second cover plate 50 side. In addition, the mating portion between the peripheral edge of the second cover plate 50 and the end edge of the second opening edge portion 35 in the other of the adjacent battery cells Ps fits into the other groove portion 106. Yet additionally, the convex portion 107 is interposed between the end portions of adjacent cases 3 on the second cover plate 50 side. Also by this configuration, the adjacent battery cells Ps are coupled with each other.

The mating portion between the peripheral edge of the first cover plate 40 and the end edge of the first opening edge portion 33 in the battery cell Ps adjacent to the terminating member 111 fits into one of the groove portions 106 of the fixing member 105 arranged on the first cover plate 40 side. In addition, the convex portion 112 on one end side in the Z direction of the terminating member 111 adjacent to the battery cell Ps fits into the other groove portion 106. Yet additionally, the convex portion 107 is interposed between the end portion of the case 3 on the first cover plate 40 side and one end portion in the Z direction end portion of the terminating member 111. By this configuration, the battery cell Ps and the terminating member 111 adjacent to each other are coupled with each other. Likewise, the mating portion between the peripheral edge of the second cover plate 50 and the end edge of the second opening edge portion 35 in the battery cell Ps adjacent to the terminating member 111 fits into one of the groove portions 106 of the fixing member 105 arranged on the second cover plate 50 side. In addition, the convex portion 112 on the other end portion in the Z direction of the terminating member 111 adjacent to the battery cell Ps fits into the other groove portion 106. Yet additionally, the convex portion 107 is interposed between the end portion of the case 3 on the second cover plate 50 side and the other end portion in the Z direction of the terminating member 111. Also by this configuration, the battery cell Ps and the terminating member 111 adjacent to each other are coupled with each other.

The frame 110 is provided with a pair of terminating members 111 (so-called end plates) and coupling members 113. The pair of terminating members 111 are arranged on both sides of a plurality of battery cells Ps aligned in the Y direction. In addition, the pair of terminating members 111 hold therebetween the plurality of battery cells Ps and a plurality of spacers 100 in the Y direction. Each coupling member 113 couples the pair of terminating members 111 with each other to fasten the plurality of battery cells Ps and the plurality of spacers 100 as a whole. The battery module M according to the present embodiment is a so-called stacked battery module M in which a plurality of battery cells Ps are stacked (aligned) in one direction.

Each terminating member 111 is formed by means of, for example, casting. This terminating member 111 is made of metal, such as aluminum. Like each spacer 100, the terminating member 111 is formed into a rectangular shape in conformity with the case 3 of each battery cell Ps being rectangular when viewed from the Y direction. Each terminating member 111 includes a rectangular frame portion, and a lattice-shaped rib formed within the frame portion. Consequently, the terminating member 111 is lightweight, while being thick to some extent in the X direction, and has rigidity. Terminating members are selected as appropriate, however, from among terminating members having various structures, including a press-molded plate-shaped terminating member in addition to the terminating members 111 of the present embodiment.

Each coupling member 113 is fixed to the terminating members 111 with fastening members, such as bolts. The coupling member 113 couples the corner portions of the pair of terminating members 111 with each other. Accordingly, four coupling members 113 are arranged in correspondence with the four corner portions of the terminating members 111. The coupling members 113 directly or indirectly abut on the respective fixing members 105 from the Z direction. The coupling members 113 prevent detaching of the fixing members 105 from the battery cells Ps and the terminating members 111.

The frame 110 is further provided with a shield 114 for totally covering the first cover plate 40 side of the plurality of battery cells Ps with a certain gap formed therebetween. The shield 114 is formed into a plate-like shape. One end portion in the Y direction of the shield 114 is fixed to one end portion in the Z direction of each terminating member 111. In addition, the side end portion in the X direction of the shield 114 is directly or indirectly supported by a pair of coupling members 113 arranged on the first cover plate 40 side.

According to the battery module M of the present embodiment having the above-described configuration, it is possible to securely fix the battery cells Ps to each other, and the battery cells Ps to the terminating members 111 by a combination of the non-conventional end portion structure of the case 3 of each battery cell Ps and the fixing members 105 having a shape in conformity to the end portion structure.

Also according to the battery module M of the present embodiment, gaps, i.e., cooling flow passages, formed between adjacent battery cells Ps and between a battery cell Ps and a terminating member 111 adjacent to each other are sealed up with fixing members 105 arranged on both lateral sides of the cooling flow passages in the Z-axis direction. Accordingly, it is possible to flow a cooling medium along the X direction without leaking the medium, and therefore, enhance cooling efficiency.

As with the fixing members 105 arranged on the second cover plate 50 side, the fixing members 105, in particular, arranged on the first cover plate 40 side function as shielding members for partitioning the external terminals 6 and the gas exhaust valves 45. Consequently, it is possible to more effectively prevent constituents of a gas and an electrolytic solution discharged from the gas exhaust valves 45 from adhering to the external terminals 6 or the vicinity thereof when the gas exhaust valves 45 operate.

Also according to the battery module M of the present embodiment, one space is formed between the first cover plate 40 side of the plurality of battery cells Ps and the shield 114. This space serves as a gas exhaust passage when the gas exhaust valves 45 operate. This gas exhaust passage and the cooling flow passage are partitioned by the fixing member 105 arranged on the first cover plate 40 side. Consequently, it is possible to effectively prevent a gas discharged from the gas exhaust valves 45 from mixing with the cooling medium and being diffused by this cooling medium when the gas exhaust valves 45 operate.

Figure 11:
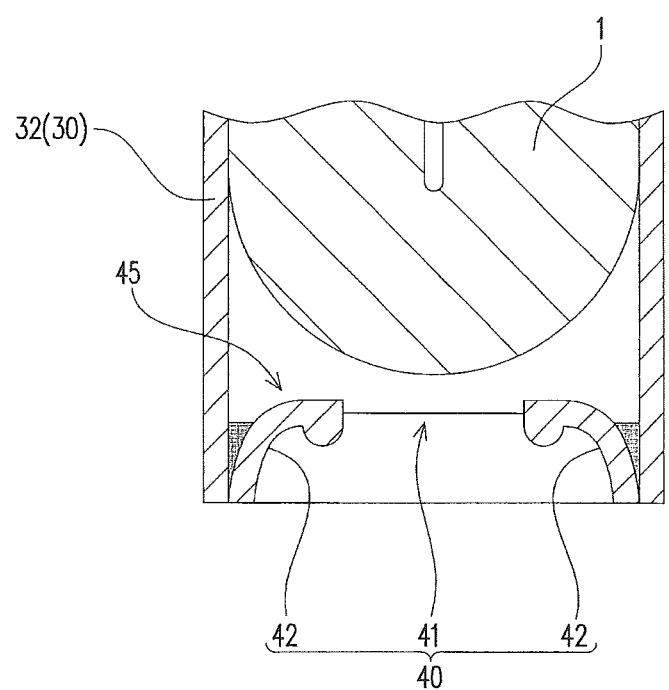
FIG. 11 is a conceptual view illustrating a state in which an electrolytic solution is accumulated in the bottom portion of the battery cell.
Figure 12:
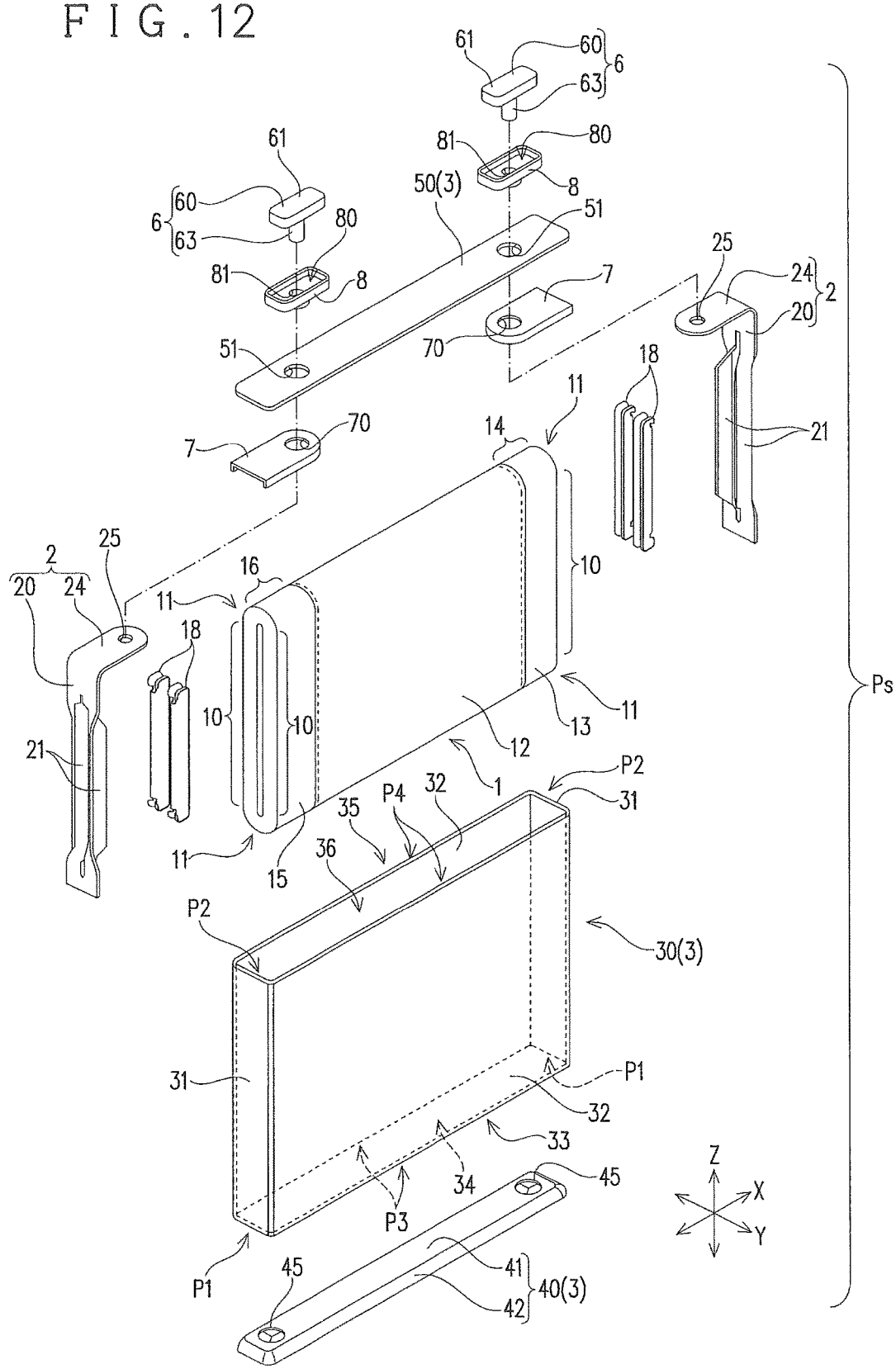
FIG. 12 is an exploded perspective view of a battery cell according to another embodiment.
Figure 13:
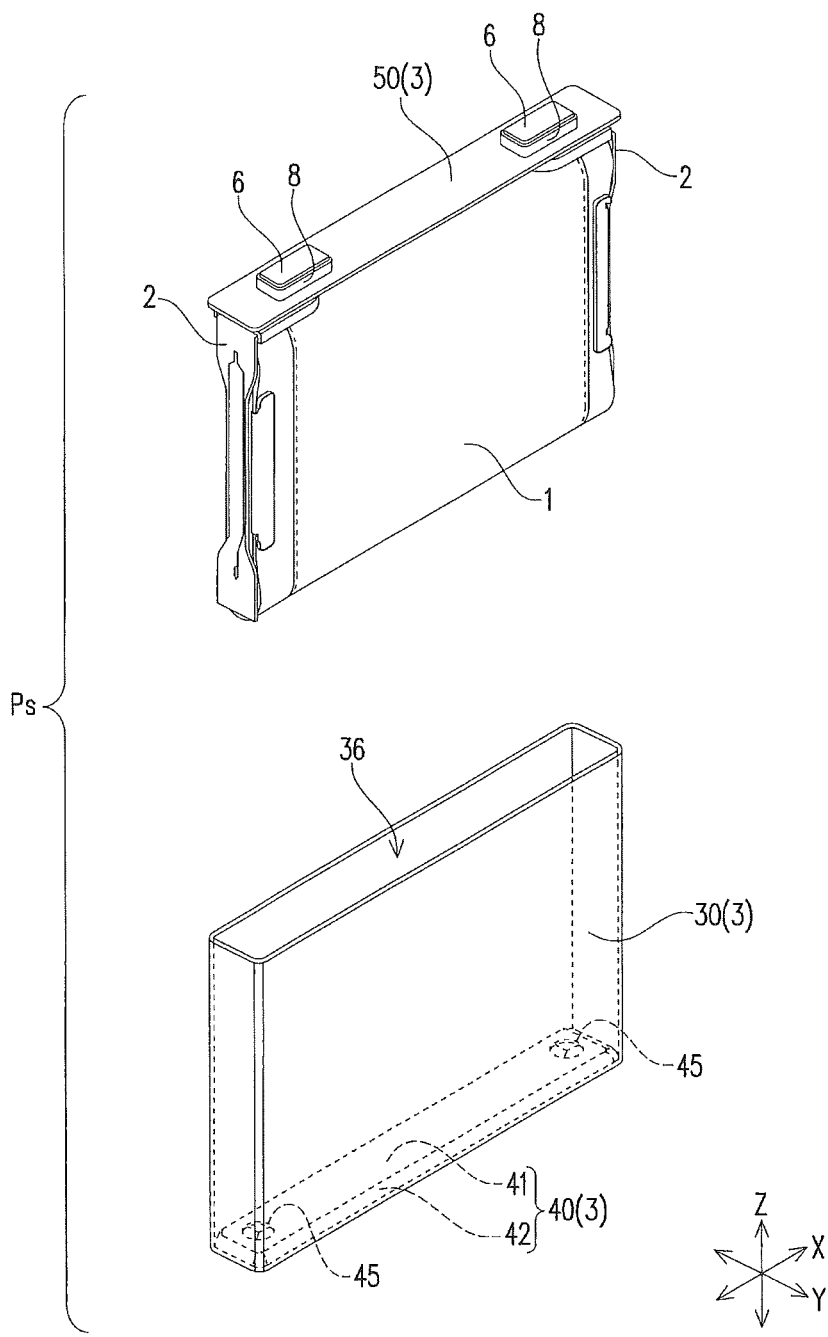
FIG. 13 is an exploded perspective view of the battery cell.
Figure 16:
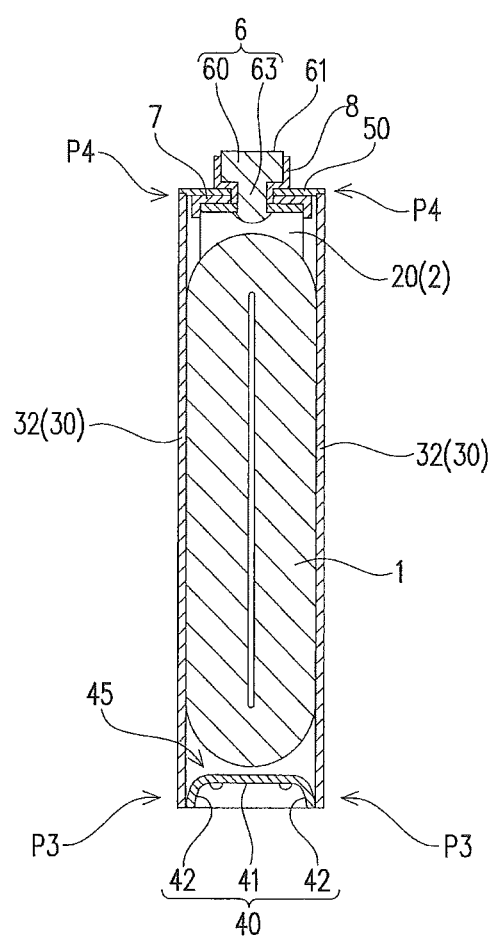
FIG. 16 is a cross-sectional view of the battery cell cut along the widthwise direction thereof.
Figure 17:
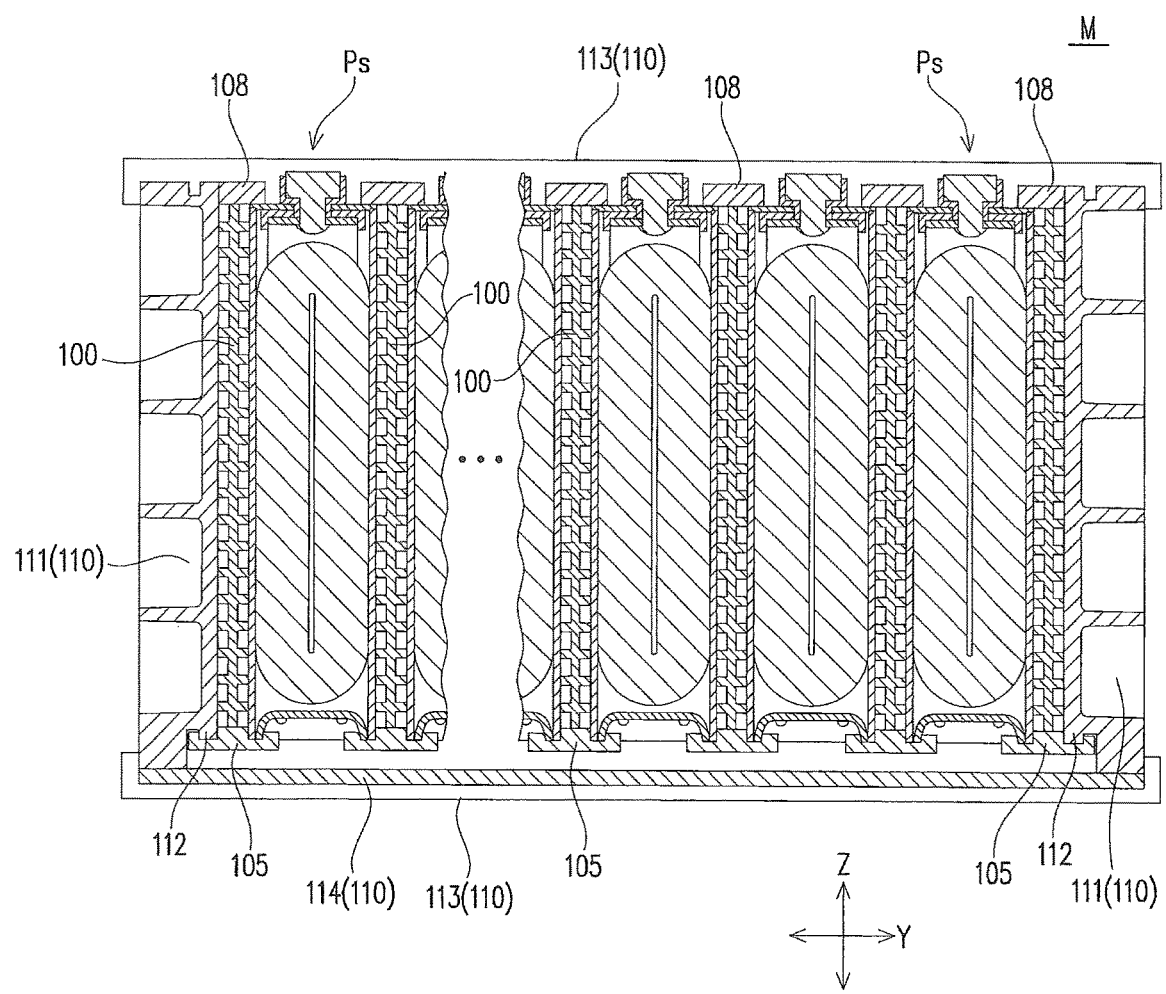
FIG. 17 is a cross-sectional view of a battery module cut along the direction in which a plurality of the battery cells are aligned.
Figure 18:
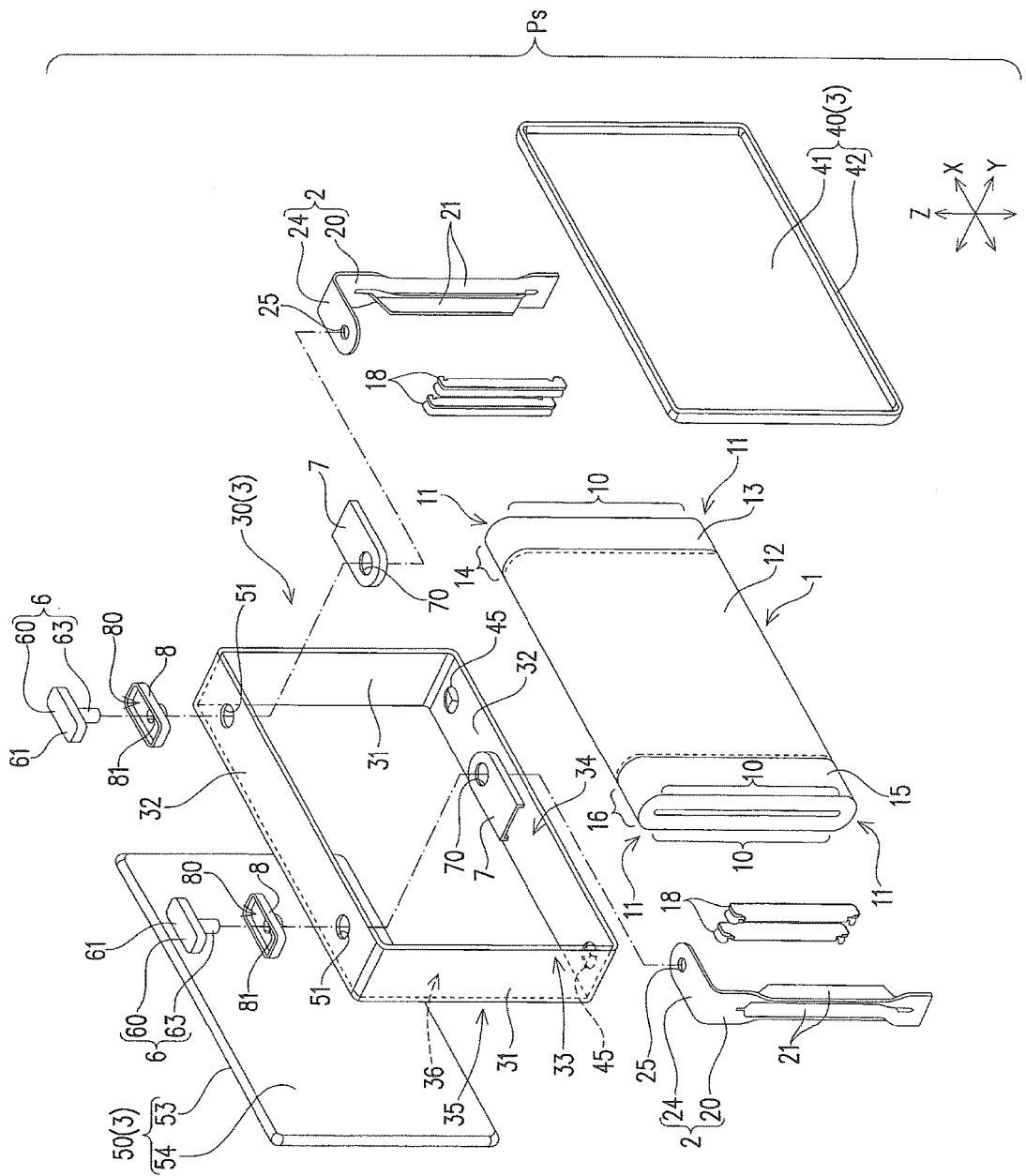
FIG. 18 is an exploded perspective view of a battery cell according to yet another embodiment.

Also according to the battery module M of the present embodiment, the first cover plate 40 which is the bottom portion of the case 3 is convexed inwardly of the case body 30. More particularly, the first cover plate 40 is shaped into a convex surface. Accordingly, the bottom portion of the case 3 is shaped so as to be elevated in the middle portion thereof and recessed in the outer peripheral portion thereof, as illustrated in FIG. 11. The electrolytic solution is thus accumulated in this recessed outer peripheral portion. Consequently, the gas exhaust valves 45 are always positioned above the level of the electrolytic solution if the amount of electrolytic solution accumulated within the case 3 is small. As a result, the gas exhaust valves 45 are not exposed to the electrolytic solution. It is therefore possible to eliminate or suitably avoid an event in which the electrolytic solution is discharged together with the gas as the gas is discharged when the gas exhaust valves 45 operate. Even if the amount of electrolytic solution accumulated within the case 3 is large and the gas exhaust valves 45 are exposed to the electrolytic solution, it is possible to reduce the amount of electrolytic solution discharged together with the gas as the gas is discharged when the gas exhaust valves 45 operate, by as much as an amount accumulated in the recessed outer peripheral portion.

In addition, the battery module M of the present embodiment is provided with a fixing member 105 arranged between adjacent battery cells Ps. This fixing member 105 includes a pair of engaging portions 106 with which the mating portion (joined portion between the peripheral edge of the first cover plate 40 (or the second cover plate 50) and the end edge of the first opening edge portion 33 (or the second opening edge portion 35)) of one of the adjacent battery cells Ps and the mating portion of the other of the adjacent battery cells Ps engage respectively. Consequently, one of the adjacent battery cells Ps and the fixing member 105 are fixed (positioned in place). Likewise, the other of the adjacent battery cells Ps and the fixing member 105 are fixed (positioned in place). As a result, the adjacent battery cells Ps are fixed (positioned in place) through the fixing member 105. This configuration prevents any positional displacement between the adjacent battery cells Ps, and restricts the relative position of the plurality of battery cells Ps.

Note that the present invention is not limited to the above-described embodiments, and it is needless to say that modifications may be made to the embodiments as appropriate, without departing from the gist of the invention.

For example, in the above-described embodiments, the first cover plate 40 and the second cover plate 50 are the same in structure. That is, the cover plates 40 and 50 which are convexed inwardly of the case body 30 are used in the first opening 34 and the second opening 36 of the case body 30, respectively. Consequently, it is possible to receive the benefit of the above-described respective effects also on the second cover plate 50 side. In particular, it is possible to prevent damage to the electrode assembly 1 due to the penetration of laser light into the case 3 since the second cover plate 50 is welded to the second opening edge portion 35 of the case body 30 under the condition of the electrode assembly 1 being inserted into the case body 3. In this regard, the electric storage device has an advantageous effect specific to the second cover plate 50. The above-described embodiments are not limited to this configuration, however. For example, the second cover plate 50 may be a flat plate member like a conventional cover plate, as illustrated in FIGS. 12 to 17. Note that the peripheral edge of the second cover plate 50 is thin-walled by means of, for example, pressing or coining. The second cover plate 50 closes the second opening 36 in such a manner that this thin-walled portion abuts on the end edge of the second opening edge portion 35 of the case body 30.

In this case, separate fixing members 108 may be applied to the end portions in the Z direction of adjacent battery cells Ps on the opposite side of the fixing member 105 thereof and to the end portions in the Z direction of a battery cell Ps and a terminating member 111 adjacent to each other on the opposite side of the fixing member 105. These fixing members 108 are formed so as to be elongated along the X direction. More particularly, each fixing member 108 is formed so as to be the same in length as the fixing member 105, or as long as the length in the X direction of the second cover plate 50. Each coupling member 113 directly or indirectly abuts on each fixing member 108 from the Z direction. Consequently, in the battery module M, each fixing member 108 is held in a state of striding over and abutting on the end portions of the adjacent battery cells Ps or the end portions of the battery cell Ps and the terminating member 111 adjacent to each other.

Note that each fixing member 108 only has contact with the second cover plate 50. Accordingly, a sealing member, such as a gasket or a flexible rib, is preferably arranged between the second cover plate 50 and the fixing member 108, in order to allow the fixing member 108 to function as a shielding member for partitioning the external terminals 6 and the gas exhaust valves 45. The flexible rib is preferably formed integrally with the fixing member 108.

In a case where a cover plate structure in which the outer peripheral portion of a cover plate rises is adopted only in an opening edge portion on one side of the case body 30, the opening edge portion may not be the first opening edge portion 33 which is on the bottom portion side of the case 3 as in the above-described embodiments. That is, the cover plate structure in which the outer peripheral portion rises may be adopted in the second opening edge portion 35 which is on the side on which the external terminal structure is located.

In the above-described embodiments, the first cover plate 40 is first fitted into the first opening edge portion 33 of the case body 30, and then the first opening edge portion 33 and the first cover plate 40 are welded to each other. After the bottomed case body 30 is fabricated in this way, the electrode assembly 1 is inserted from the second opening 36 of the case body 30 into the case body 30. Subsequently, the second cover plate 50 is welded to the second opening edge portion 35. However, the manufacturing method of the battery cell Ps is not limited to this method. After the electrode assembly 1 is inserted into the case body 30, the first cover plate 40 and the second cover plate 50 may be welded to the first opening edge portion 33 and the second opening edge portion 35 of the case body 30.

Also in the above-described embodiments, the outer peripheral portion 42 of the first cover plate 40 curves until intersecting with the base portion 41 at right or substantially right angles, thus causing the peripheral edge of the first cover plate 40 to have surface contact with the inner circumferential surface of the first opening edge portion 33 within a predetermined range. The embodiments are not limited to this configuration, however. For example, the outer peripheral portion 42 of the first cover plate 40 may not curve until intersecting with the base portion 41 at right or substantially right angles. The peripheral edge of the first cover plate 40 may thus have contact with the inner circumferential surface of the first opening edge portion 33, so as to intersect therewith. This also holds true for the second cover plate 50 in a case where the second cover plate 50 is the same in structure as the first cover plate 40.

Also in the above-described embodiments, the first cover plate 40 is provided with the base portion 41 positioned within the case body 30, and the outer peripheral portion 42 rising by flexion from the peripheral edge of the base portion 41. The embodiments are not limited to this configuration, however. For example, the first cover plate 50 may be semicircular, semielliptical, or the like in the cross-sectional shape thereof in which the boundary between the base portion and the outer peripheral portion is not clearly defined. This also holds true for the second cover plate 50 in a case where the second cover plate 50 is the same in structure as the first cover plate 40.

Also in the above-described embodiments, the mating portions of the peripheral edge of the first cover plate 40 and the end edge of the first opening edge portion 33 of the case body 30 are joined to each other. The embodiments are not limited to this configuration, however. For example, the peripheral edge of the first cover plate 40 and the inner circumferential surface of the first opening edge portion 33 may be joined to each other under the condition of the first cover plate 40 being fitted into the first opening edge portion 33, so that the peripheral edge of the first cover plate 40 is shifted further into the case body 30 than the end edge of the first opening edge portion 33.

Figure 20:
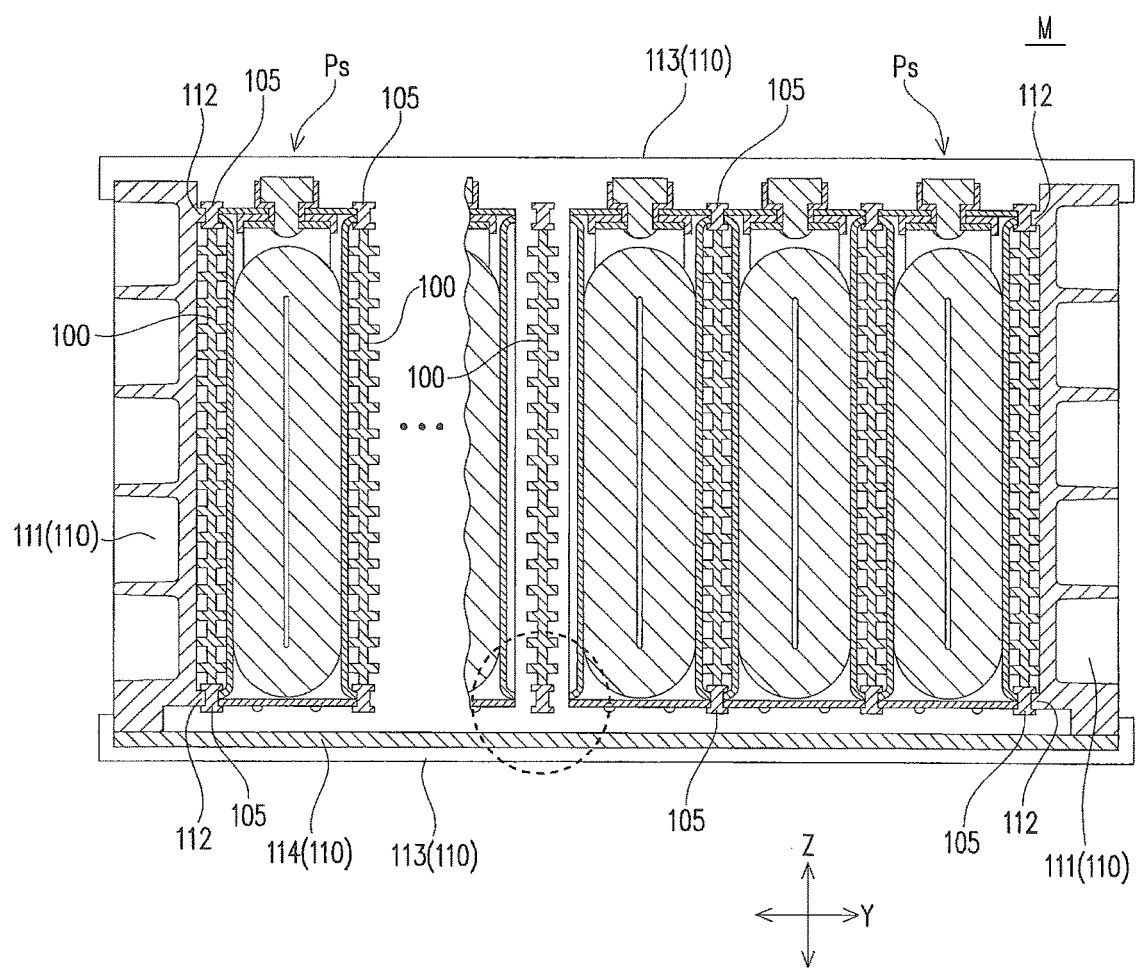
FIG. 20 is a cross-sectional view of a battery module cut along the direction in which a plurality of the battery cells are aligned.
Figure 21:
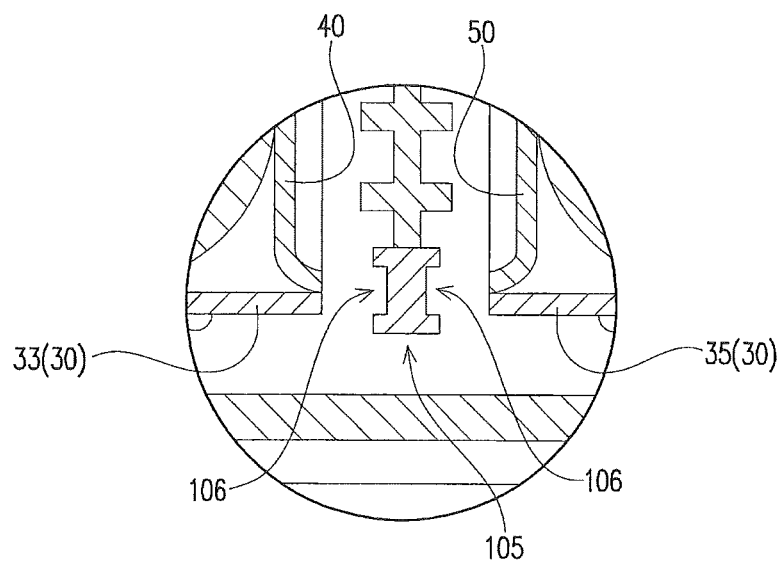
FIG. 21 is an enlarged view of components encircled by a dashed line in FIG. 20.

In the battery cell Ps of the above-described embodiments, the case body 30 is open in the Z direction, the first cover plate 40 corresponds to the bottom portion of the case 3, and the external terminal structure is located in the second cover plate 50. The embodiments are not limited to this configuration, however. As illustrated in FIGS. 18 to 21, the case body 30 may be open in the Y direction, and the external terminal structure may be located in a wall portion of the case body 30. Alternatively, the case body 30 may be open in the X direction, though the opening area of the case body 30 is reduced, and the external terminal structure may be located in a wall portion of the case body 30. Note that a circular dashed line in FIG. 20 is intended to indicate a region to be shown in enlarged view in FIG. 21, and is not a line for illustrating the configuration of the battery module M.

Figure 22:
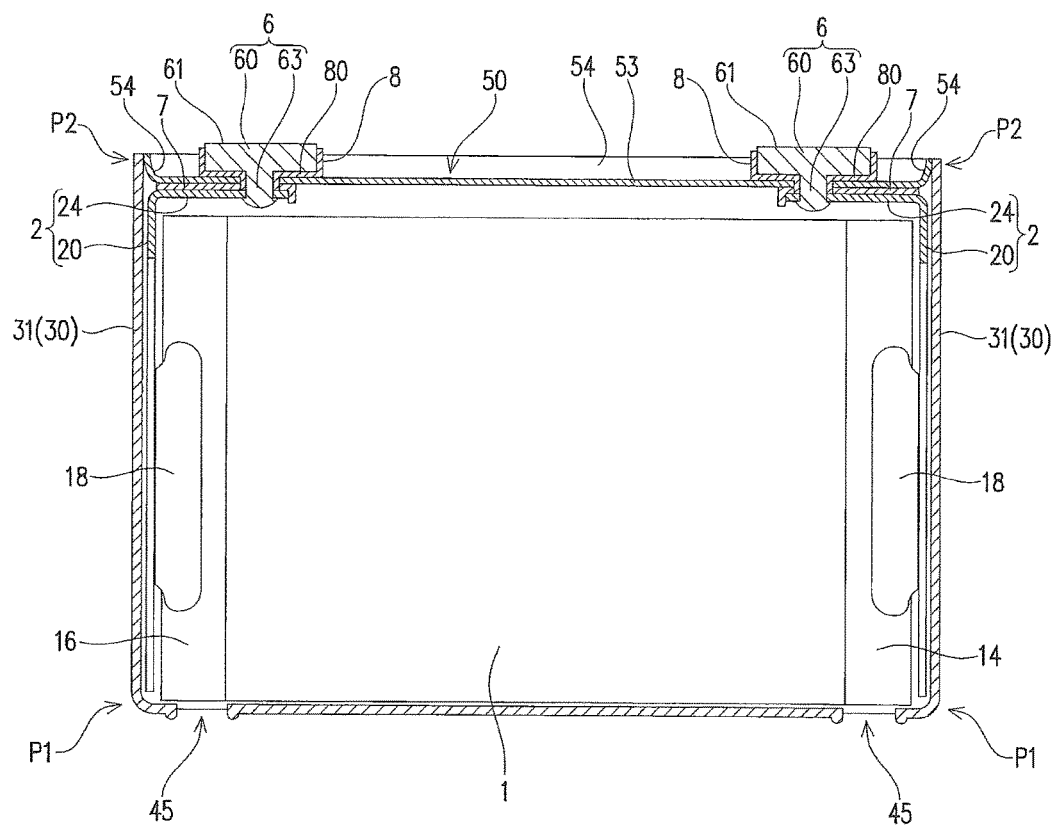
FIG. 22 is a cross-sectional view of a battery cell according to still another embodiment cut along the lengthwise direction thereof.
Figure 23:
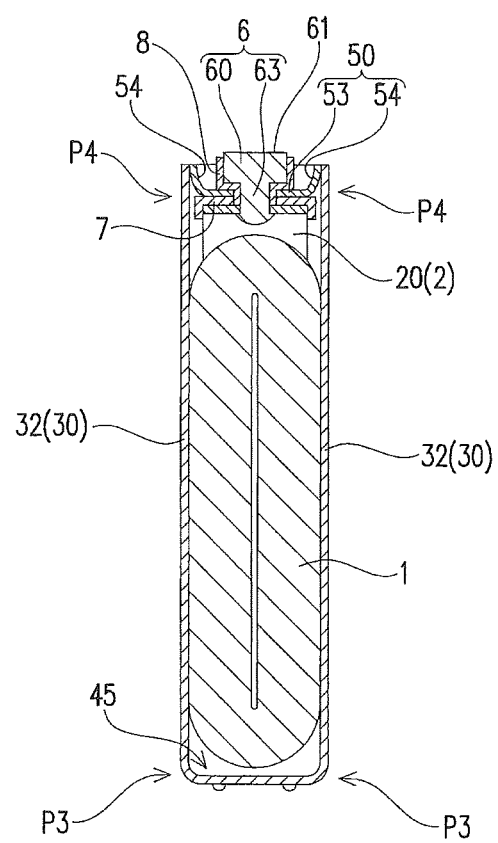
FIG. 23 is a cross-sectional view of the battery cell cut along the widthwise direction thereof.
Figure 24:
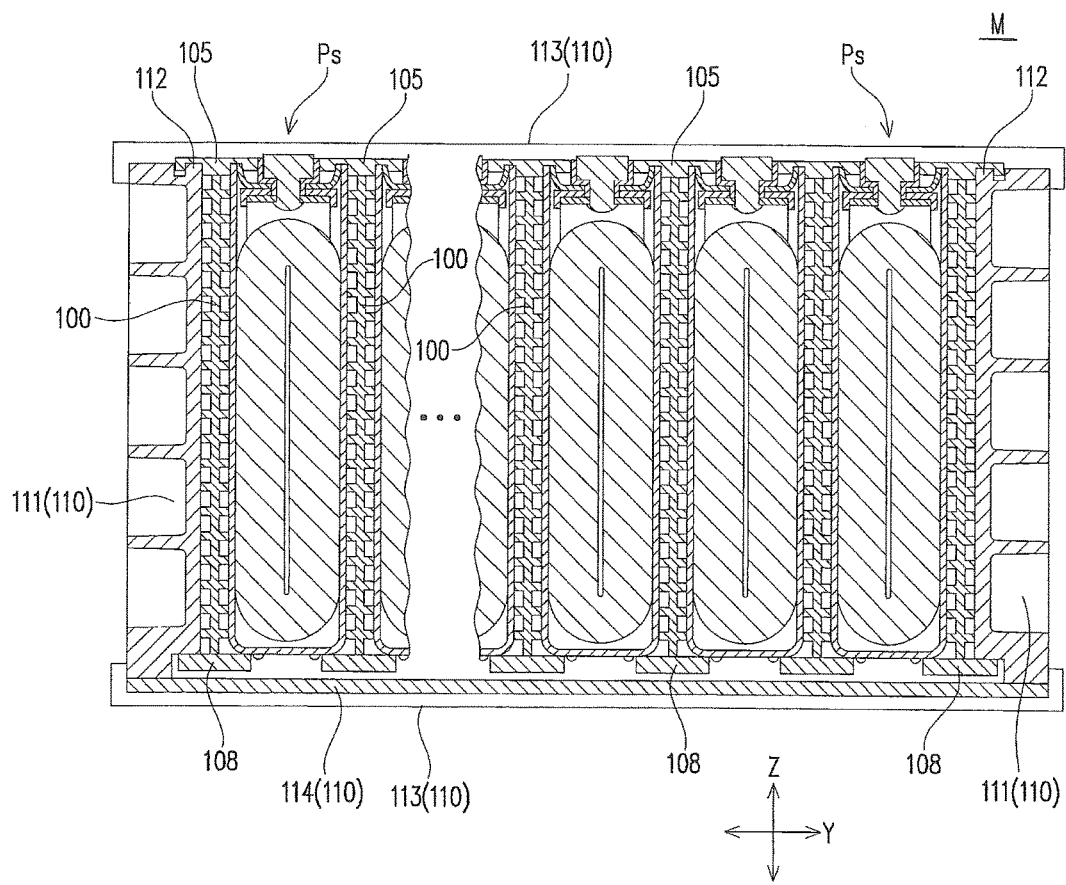
FIG. 24 is a cross-sectional view of a battery module cut along the direction in which a plurality of the battery cells are aligned.

The case 3 of the above-described embodiments has a three-piece structure composed of the case body 30, the first cover plate 40 and the second cover plate 50. The embodiments are not limited to this configuration, however. As illustrated in FIGS. 22 to 24, the case 3 may be a conventional case in which the case body 30 is formed into a bottomed shape by means of, for example, deep drawing, and the cover plate 50 is welded to the opening edge portion of one end of the case body 30.

In this case, separate fixing members 108 may be applied to the end portions in the Z direction of adjacent battery cells Ps on the opposite side of the fixing member 105 thereof and to the end portions in the Z direction of a battery cell Ps and a terminating member 111 adjacent to each other on the opposite side of the fixing member 105. These fixing members 108 are formed so as to be elongated along the X direction. More particularly, each fixing member 108 is formed so as to be the same in length as the fixing member 105, or as long as the length in the X direction of the bottom portion of the case body 30. Each coupling member 113 directly or indirectly abuts on each fixing member 108 from the Z direction. Consequently, each fixing member 108 is held in a state of striding over and abutting on the end portions of the adjacent battery cells Ps or the end portions of the battery cell Ps and the terminating member 111 adjacent to each other.

Note that each fixing member 108 only has contact with the bottom portion of the case body 30. Accordingly, a sealing member, such as a gasket or a flexible rib, is preferably arranged between the bottom portion of the case body 30 and the fixing member 108, in order to allow the fixing member 108 to function as a shielding member for partitioning the external terminals 6 and the gas exhaust valves 45 or partitioning gas exhaust passages and cooling flow passages. The flexible rib is preferably formed integrally with the fixing member 108.

The welded-type external terminals 6 are adopted as the external terminal structure of the above-described embodiments. The embodiments are not limited to this configuration, however. For example, threaded external terminals may be adopted as the external terminal structure.

Also in the above-described embodiments, joinings are formed between the first cover plate 40 and the first opening edge portion 33 of the case body 30 and between the second cover plate 50 and the second opening edge portion 35 of the case body 30 by means of laser welding. The embodiments are not limited to this configuration, however. As joining methods, various means are used, including ultrasonic joining, resistance welding, caulking and bonding, in addition to laser welding.

Also in the above-described embodiments, the winding-type electrode assembly 1 is adopted in which the elongated positive electrode plate 13, negative electrode plate 15 and separator 12 are wound together. However, the electrode assembly may be formed by laminating a plurality of positive electrode plates, a plurality of negative electrode plates and a plurality of separators.

Also in the above-described embodiments, the description has been made for a lithium-ion secondary battery. The type and size (capacity) of the battery cell are optional, however.

In addition, the present invention is not limit to a lithium-ion secondary battery. The present invention is also applicable to primary battery cells and capacitors, such as electric double layer capacitors, in addition to various types of secondary battery cells.

Also in the above-described embodiments, the frame 110 provided with the pair of terminating members 111 and the coupling members 113 is used as the holding member. The frame 110 securely holds the plurality of stacked (aligned) battery cells Ps. The embodiments are not limited to this configuration, however. The holding member may be, for example, a case-like (box-shaped) enclosure for housing a plurality of battery cells Ps with gaps therebetween.

Figure 25:
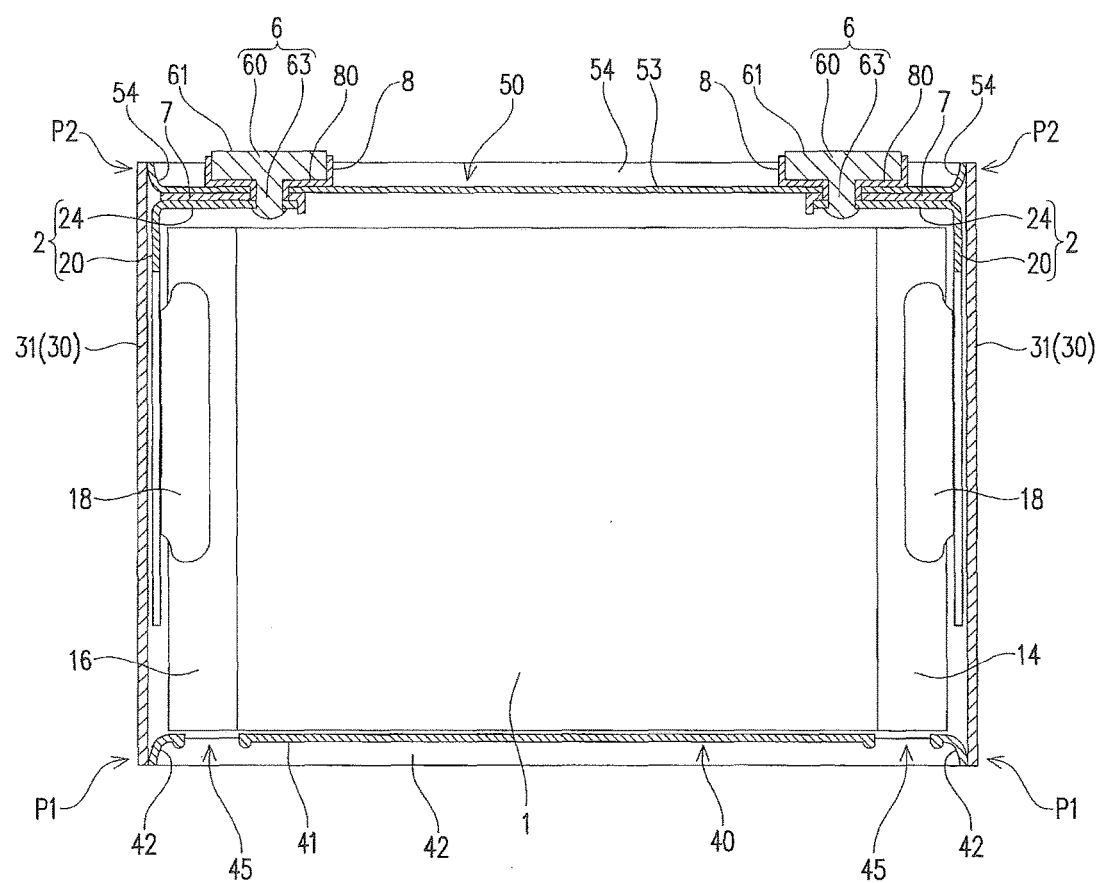
FIG. 25 is a cross-sectional view of a battery cell according to still another embodiment cut along the lengthwise direction thereof.

Also in the above-described embodiments, the positive-electrode lead portion 14 and the negative-electrode lead portion 16 of the electrode assembly 1 are connected to the current collectors 2 at middle portions of the electrode assembly 1 in the Z direction. The embodiments are not limited to this configuration, however. For example, the connecting portions (welded portions) between the positive-electrode lead portion 14 and one current collector 2 and between the negative-electrode lead portion 16 and the other current collector 2 may be located in positions farther from the first cover plate 40 and closer to the second cover plate 50 in the electrode assembly 1, as illustrated in FIG. 25. This configuration increases the degree of openness of the positive-electrode lead portion 14 and the negative-electrode lead portion 16 on the first cover plate 40 side. Consequently, it is possible to enhance the efficiency of discharging a gas generated inside the electrode assembly 1 from the positive-electrode lead portion 14 and the negative-electrode lead portion 16.

Also in the above-described embodiments, the relative positions between battery cells Ps and between a battery cell Ps and a terminating member 111 in the Y direction are fixed by the spacers 100 and the fixing members 105. The embodiments are not limited to this configuration, however. The spacers 100 may be excluded from the embodiments and the relative positioning may be performed using the fixing members 105 only.

If both of the spacers 100 and the fixing members 105 are included in the embodiments, these two types of components may be integral with each other, rather than being separate components. In this case, each spacer may be integrated with either one of a pair of fixing members in the Z direction or the other fixing member. Alternatively, the pair of fixing members and the spacer may be integrated with each other if each spacer has a certain degree of flexibility. If the battery module M has the configuration illustrated in FIG. 17 or 24, the spacers 100 and the fixing members 108 may be integrated with each other.

In the battery cell Ps of the above-described embodiments, the gas exhaust valves 45 are formed in part of the first cover plate 40. The embodiments are not limited to this configuration, however. For example, a difference may be made between the critical withstand pressure of one of the first cover plate 40 and the second cover plate 50 and the case body 30 and the critical withstand pressure of the other of the first cover plate 40 and the second cover plate 50 and the case body 30. This way of configuration causes the joined portion between one of the cover plates 40 and 50 and the opening edge portion 33 or 35 to be partially or totally destroyed if the internal pressure of the case 3 exceeds a certain value. As a result, there is formed a passage for releasing the internal pressure of the case 3. That is, one of the cover plates 40 and 50 functions (operates) as a gas exhaust valve. At this time, the critical withstand pressure of the first cover plate 40 and the case body 30 is preferably lower than the critical withstand pressure of the second cover plate 50 provided with the external terminals 6 and the case body 30. Consequently, it is possible to prevent constituents of a gas and an electrolytic solution discharged from a destroyed location from adhering to the external terminals 6 or the vicinity thereof in case the joined portion between the first cover plate 40 and the first opening edge portion 33 is partially or totally destroyed (that is, if the first cover plate 40 functions (operates) as a gas exhaust valve).

In this case, the battery cell Ps is preferably held securely by the holding member. Consequently, the case body 30 of the battery cell Ps is placed in a state of being pressurized (compressed). Accordingly, the case body 30 swells and reduces the internal pressure of the case 3 if the internal pressure exceeds a certain value, and therefore, the joined portion between one of the first cover plates 40 and 50 and the opening edge portion 33 or 35 is not destroyed. That is, it is possible to reduce the problem of, for example, the one of the cover plates 40 and 50 failing to function (operate) as a gas exhaust valve when the internal pressure reaches an expected value.

What is claimed is:

1. An electric storage device, comprising:
   an electrode assembly including a positive electrode plate and a negative electrode plate insulated from each other;
   a case for housing the electrode assembly, the case being insulated from the electrode assembly;
   a positive-electrode external terminal arranged on an outer surface of the case and electrically connected to the positive electrode plate, and a negative-electrode external terminal arranged on the outer surface of the case and electrically connected to the negative electrode plate; and
   a gas exhaust valve formed in a region of the case on an opposite side of a region where the positive-electrode external terminal and the negative-electrode external terminal are arranged,
   wherein the electrode assembly includes a multilayer structure in which the positive electrode plate and the negative electrode plate are multilayered, at least one of the positive electrode plate and the negative electrode plate includes a lead portion which protrudes from the multilayer structure in a first direction that the positive-electrode external terminal is spaced apart from the negative-electrode external terminal, and the gas exhaust valve is overlaps with the lead portion in a second direction orthogonal to the first direction, the second direction extending from the region of the case in which the gas exhaust valve is located to the region where the positive-electrode external terminal and the negative-electrode external terminal are arranged:
   wherein the case comprises:
      a case body including a first opening edge portion in one end thereof;
      a first cover plate for closing a first opening formed by the first opening edge portion, wherein the case exhaust valve is formed in the first cover plate; and
      the first cover plate is convexed inwardly.

2. The electric storage device according to claim 1, wherein the case includes a pair of opposed outer surfaces, the positive-electrode external terminal and the negative-electrode external terminal are located on one of the pair of outer surfaces, and the gas exhaust valve is formed on an other of the pair of opposed outer surfaces.

3. The electric storage device according to claim 1, wherein the case body includes a second opening edge portion which is an opening edge portion located on an opposite side of the first opening edge portion, and the case comprises a second cover plate for closing a second opening formed by the second opening edge portion.

4. The electric storage device according to claim 1, wherein the first cover plate comprises a plate member in which an outer peripheral portion of the first cover plate is mated with the inner circumferential surface of the first opening edge portion and which is convexed inwardly, and the gas exhaust valve is formed in a portion of the first cover plate convexed inwardly.

5. The electric storage device according to claim 1, wherein the multilayer structure is formed such that the positive electrode plate and the negative electrode plate are wound so as to have a flattened shape including a pair of opposed flat portions and a pair of curved portions connecting end portions of the pair of flat portions to each other, the lead portion protrudes in a direction in which at least one of the positive electrode plate and the negative electrode plate extends along a winding center of the electrode assembly from a side edge of an other electrode plate, and the gas exhaust valve is formed in a place of the case opposed to the curved portions of the lead portion.

6. The electric storage device according to claim 1, wherein the lead portion comprises a positive-electrode lead portion in one end of the electrode assembly and a negative-electrode lead portion in an other end of the electrode assembly, and the gas exhaust valve includes a first gas exhaust valve formed in a place of the case opposed to the positive-electrode lead portion and a second gas exhaust valve formed in a place of the case opposed to the negative-electrode lead portion.

7. The electric storage device according to claim 1, further comprising a first current collector for connecting the positive electrode plate and the positive-electrode external terminal and a second current collector for connecting the negative electrode plate and the negative-electrode external terminal,
   wherein a connecting portion between the electrode assembly and at least one of the first current collector and the second current collector is formed in a position of the electrode assembly displaced toward regions where the positive-electrode external terminal and the negative-electrode external terminal are arranged.

8. An electric storage apparatus comprising two or more electric storage devices including at least one electric storage device according to claim 1.

9. The electric storage apparatus according to claim 8, further comprising a shielding member arranged between adjacent electric storage devices of the two or more electric storage devices,
   wherein the shielding member partitions a space in which at least one of the positive-electrode external terminal and the negative-electrode external terminal is arranged and a space in which the gas exhaust valve is arranged.

10. The electric storage apparatus according to claim 9, wherein a gap is formed between the adjacent electric storage devices, and the shielding member includes a first shielding member for partitioning the gap and the space in which the gas exhaust valve is arranged.

11. The electric storage apparatus according to claim 10, wherein the shielding member includes a second shielding member for partitioning the gap and the space in which at least one of the positive-electrode external terminal and the negative-electrode external terminal is arranged.

12. The electric storage apparatus according to claim 10, wherein the gap formed between the adjacent electric storage devices includes a cooling flow passage through which a cooling fluid is configured to flow.

13. The electric storage apparatus according to claim 9, further comprising a spacer arranged between the adjacent electric storage devices, wherein the shielding member is formed integrally with the spacer.

14. The electric storage apparatus according to claim 9, further comprising a gasket or a rib arranged between the shielding member and the electric storage device.

15. An electric storage device, comprising:
an electrode assembly including a positive electrode plate and a negative electrode plate insulated from each other;
a case for housing the electrode assembly, the case comprising:
a case body including a first opening edge portion and a second opening edge portion in both ends thereof;
a first cover plate for closing a first opening formed by the first opening edge portion; and
a second cover plate for closing a second opening formed by the second opening edge portion; and
a positive-electrode external terminal arranged on an outer surface of the case and electrically connected to the positive electrode plate, and a negative-electrode external terminal arranged on the outer surface of the case and electrically connected to the negative electrode plate,
wherein at least one of the first cover plate and the second cover plate includes a plate member in which an outer peripheral portion of the cover plate mates with an inner circumferential surface of one of the first opening edge portion and the second opening edge portion corresponding to the cover plate and which is convexed inwardly, and the outer peripheral portion and one of the first opening edge portion and the second opening edge portion corresponding to the cover plate having the outer peripheral portion are joined to each other,
wherein the electrode assembly includes a multilayer structure in which the positive electrode plate and the negative electrode plate are multilayered, at least one of the positive electrode plate and the negative electrode plate includes a lead portion which protrudes from the multilayer structure in a first direction that the positive-electrode external terminal is spaced apart from the negative-electrode external terminal, and a gas exhaust valve overlaps with the lead portion in a second direction orthogonal to the first direction, the second direction extending from the first cover plate to the second cover plate, and
wherein the first cover plate and second cover plate include an outer peripheral portion that mates with the inner circumferential surface of the corresponding opening edge portion and that is convexed inwardly, and the first outer peripheral portion is joined to the inner circumferential surface of the first opening edge portion and the second outer peripheral portion is joined to the inner circumferential surface of the second opening edge portion.

16. An electric storage device, comprising:
an electrode assembly including a positive electrode plate and a negative electrode plate insulated from each other;
a case for housing the electrode assembly, the case comprising:
a case body including a first opening edge portion and a second opening edge portion in both ends thereof;
a first cover plate for closing a first opening formed by the first opening edge portion; and
a second cover plate for closing a second opening formed by the second opening edge portion; and
a positive-electrode external terminal arranged on an outer surface of the case and electrically connected to the positive electrode plate, and a negative-electrode external terminal arranged on the outer surface of the case and electrically connected to the negative electrode plate,
wherein the electrode assembly includes a multilayer structure in which the positive electrode plate and the negative electrode plate are multilayered, at least one of the positive electrode plate and the negative electrode plate includes a lead portion which protrudes from the multilayer structure in a first direction that the positive-electrode external terminal is spaced apart from the negative electrode external terminal, and
wherein a critical withstand pressure in an area of one of the first cover plate and the second cover plate is made lower than a critical withstand pressure of an other of the first cover plate and the second cover plate and the case body, the area of said one of the first cover plate and the second cover plate overlapping with the lead portion in a second direction orthogonal to the first direction, the second direction extending from the first cover plate to the second cover plate, and
wherein the first cover plate and second cover plate include an outer peripheral portion that mates with the inner circumferential surface of the corresponding opening edge portion and that is convexed inwardly, and the first outer peripheral portion is joined to the inner circumferential surface of the first opening edge portion and the second outer peripheral portion is joined to the inner circumferential surface of the second opening edge portion.

17. An electric storage apparatus, comprising:
an electric storage device according to claim 16; and
a holding member for holding the electric storage device.

18. An electric storage apparatus, comprising:
a plurality of electric storage devices each of which includes an electrode assembly including a positive electrode plate and a negative electrode plate insulated from each other and a case for housing the electrode assembly, the electric storage devices aligning in an arrangement direction; and
a fixing member arranged between adjacent electric storage devices,
the case comprising:
a case body including at least one opening edge portion; and
a cover plate joined to the opening edge portion,
wherein the case exhaust valve is formed in the cover plate; and
the cover plate is convexed inwardly,
wherein a mating portion which is the joined portion between the case body and the cover plate is formed by joining the case body and the cover plate, and the fixing member includes a pair of engaging portions engaged respectively with the mating portion of one of adjacent electric storage devices and the mating portion of an other of the adjacent electric storage devices,
wherein at least one of the electric storage devices comprises a positive-electrode external terminal arranged on an outer surface of the case and electrically connected to the positive electrode plate, and a negative-electrode external terminal arranged on the outer surface of the case and electrically connected to the negative electrode plate, and
wherein the electrode assembly includes a multilayer structure in which the positive electrode plate and the negative electrode plate are multilayered, at least one of the positive electrode plate and the negative electrode plate includes a lead portion which protrudes from the multilayer structure in a first direction that the positive-electrode external terminal is spaced apart from the negative-electrode external terminal, and a gas exhaust valve overlaps with the lead portion in a second direction orthogonal to the first direction, the second direction extending from the outer surface of the case to the cover plate.

19. The electric storage device according to claim 1, wherein the electrode assembly further includes a separator that insulates the positive electrode plate from the negative electrode plate, and wherein, in the first direction, the lead portion protrudes from the separator such that, in the second direction, an exposed surface of the lead portion, protruded from the separator, overlaps with the lead portion.

* * * * *